United States Patent
Takakuwa et al.

(10) Patent No.: US 12,337,407 B2
(45) Date of Patent: Jun. 24, 2025

(54) COPPER ALLOY ASSEMBLY AND PRODUCTION METHOD THEREFOR

(71) Applicants: KYUSHU UNIVERSITY, NATIONAL UNIVERSITY CORPORATION, Fukuoka (JP); NGK INSULATORS, LTD., Nagoya (JP)

(72) Inventors: Osamu Takakuwa, Fukuoka (JP); Hisao Matsunaga, Fukuoka (JP); Takahiro Ishikawa, Toyoake (JP); Hiromitsu Uchiyama, Agui (JP); Masato Sakakibara, Handa (JP); Masaaki Akaiwa, Handa (JP)

(73) Assignees: Kyushu University, National University Corporation, Fukuoka (JP); NGK INSULATORS, LTD., Nagoya (JP)

( * ) Notice: Subject to any disclaimer, the term of this patent is extended or adjusted under 35 U.S.C. 154(b) by 0 days.

(21) Appl. No.: 18/341,063

(22) Filed: Jun. 26, 2023

(65) Prior Publication Data
US 2023/0356321 A1 Nov. 9, 2023

Related U.S. Application Data

(63) Continuation of application No. PCT/JP2021/049009, filed on Dec. 28, 2021.

(30) Foreign Application Priority Data

Jan. 8, 2021 (JP) ................................ 2021-002418

(51) Int. Cl.
*B23K 20/02* (2006.01)
*B23K 20/00* (2006.01)
(Continued)

(52) U.S. Cl.
CPC ............ *B23K 20/02* (2013.01); *B23K 20/001* (2013.01); *B32B 15/01* (2013.01); *C22C 9/00* (2013.01);
(Continued)

(58) Field of Classification Search
CPC ........ B23K 20/02; B23K 20/001; C22C 9/00; C22C 9/06
(Continued)

(56) References Cited

U.S. PATENT DOCUMENTS 6,077,365 A * 6/2000 Kawamura .......... B23K 35/002
420/494
6,878,250 B1 4/2005 Segal et al.
(Continued)

FOREIGN PATENT DOCUMENTS

JP H09-087780 A 3/1997
JP 2005-533187 A 11/2005
(Continued)

OTHER PUBLICATIONS

International Search Report and Written Opinion (Application No. PCT/JP2021/049009) dated Mar. 22, 2022 (with English translation) (11 pages).
(Continued)

*Primary Examiner* — Katherine A Christy
(74) *Attorney, Agent, or Firm* — BURR PATENT LAW, PLLC

(57) ABSTRACT

A copper alloy bonded body composed of a plurality of members made of an age-hardenable copper alloy, the members diffusion-bonded to one another. The copper alloy bonded body has undergone solution annealing and an aging treatment, the content of beryllium in the age-hardenable copper alloy is 0.7% by weight or less, and (i) a bonding interface between the members has disappeared and/or (ii) a
(Continued)

bonding interface between the members remains, and an oxide film at the bonding interface has a thickness of 0 nm or more and 5.0 nm or less.

23 Claims, 15 Drawing Sheets

(51) Int. Cl.
  *B32B 15/01* (2006.01)
  *C22C 9/00* (2006.01)
  *C22C 9/06* (2006.01)
  *C22F 1/00* (2006.01)
  *C22F 1/02* (2006.01)
  *C22F 1/08* (2006.01)

(52) U.S. Cl.
  CPC ............... *C22C 9/06* (2013.01); *C22F 1/002* (2013.01); *C22F 1/02* (2013.01); *C22F 1/08* (2013.01)

(58) Field of Classification Search
  USPC ........................................................ 428/637
  See application file for complete search history.

(56) References Cited

U.S. PATENT DOCUMENTS

| 12,092,401 B2 | 9/2024 | Takahashi et al. |
| 2004/0072009 A1 | 4/2004 | Segal et al. |
| 2012/0270070 A1 | 10/2012 | Hong et al. |
| 2022/0119930 A1 | 4/2022 | Ishikawa et al. |

FOREIGN PATENT DOCUMENTS

| JP | 2010-000532 A | 1/2010 |
| JP | 2017-145472 A | 8/2017 |
| JP | 2018-059198 A | 4/2018 |
| WO | 2018066414 A1 | 4/2018 |
| WO | 2020/105658 A1 | 5/2020 |
| WO | 2021/002364 A1 | 1/2021 |

OTHER PUBLICATIONS

Korean Office Action (with English translation) dated Dec. 9, 2024 (Application No. 10-2023-7020498).
Extended European Search Report, European Application No. 21917780.5 dated Apr. 30, 2025 (14 pages).
Anonymous "C17510," dated Jun. 3, 2016, XP093271091, Retrieved from the Internet: URL:https://web.archive.org/web/20160603161928/http://alloys.copper.org: 80/alloy/C17510 (7 pages).
Anonymous "C18150", dated Jul. 19, 2015, XP093271094, Retrieved from the Internet: URL:https://web.archive.org/web/20150719030345/https://alloys.copper.org/alloy/C18150 (3 pages).
Purcek, G et al. "Optimization of strength, ductility and electrical conductivity of Cu—Cr—Zr alloy by combining multi-route ECAP and aging", dated Sep. 30, 2015, Materials Science, vol. 649, pp. 114-122, XP029299298 (9 pages).

\* cited by examiner

Acid Washing - Loading into Furnace

Temperature Increase (Progress of Oxidation)

Appearances of Samples

AWS stands for acid-washed surface. IFOS stands for in-furnace open surface. CCS stands for close contact surface Example 47
AMPCO940(Cu-2.3Ni-0.6Si-0.5Cr-0.1Sn)

Bonding surface obviously remains.

200X

500X

1000X

Example 53
AMPCO944(Cu-7.1Ni-1.7Si-0.6Cr)

Bonding surface obviously remains.

COPPER ALLOY ASSEMBLY AND PRODUCTION METHOD THEREFOR

CROSS-REFERENCE TO RELATED APPLICATIONS

This application is a continuation application of PCT/JP2021/049009 filed Dec. 28, 2021, which claims priority to Japanese Patent Application No. 2021-002418 filed Jan. 8, 2021, the entire contents all of which are incorporated herein by reference.

BACKGROUND OF THE INVENTION

1. Field of the Invention

The present invention relates to a copper alloy bonded body and a method for producing the same.

2. Description of the Related Art

In a hydrogen station that supplies hydrogen to a fuel cell vehicle or the like, a pre-cooler for enabling rapid supply of high-pressure hydrogen cooled to about −45° C. is installed. That is, when a tank of a fuel cell vehicle or the like is rapidly filled with hydrogen, the temperature of the tank rises due to adiabatic compression, which is dangerous, and therefore hydrogen, when supplied, is cooled with a pre-cooler in advance, which enables safe and rapid supply of high-pressure hydrogen to a fuel cell vehicle or the like. Accordingly, a material including tensile strength that is bearable to high pressure and a thermal conductive property that enables efficient cooling, not to mention being free from hydrogen brittleness, is preferably used for a heat exchanger which is a main component of a pre-cooler for a hydrogen station. Currently, stainless steel for high-pressure hydrogen, such as SUS316L (Ni equivalent material), is adopted for a heat exchanger of a pre-cooler for a hydrogen station from a requirement of not causing hydrogen embrittlement to occur, but there is still room for improvements from the viewpoint of the tensile strength and thermal conductive property.

Beryllium copper, which is known as a material having a high tensile strength and thermal conductive property, is suitable for a material for a heat exchanger and has been confirmed not to cause hydrogen embrittlement to occur even under high-pressure hydrogen. For example, Patent Literature 1 (JPH9-87780A) discloses a beryllium copper alloy for a heat exchanger, wherein the content by percentage of Be is 1.0 to 2.5%, the total content by percentage of Ni and Co is 0.2 to 0.6%, and the balance is composed of Cu and inevitable impurities, although the beryllium copper alloy is not for a hydrogen station. In addition, Patent Literature 2 (JP2017-145472A) discloses a beryllium copper alloy, wherein the content of Be is 0.20 to 2.70% by weight, the total content of Co, Ni, and Fe is 0.20 to 2.50% by weight, and the total content of Cu, Be, Co, and Ni is 99% by weight or more, and states that the beryllium copper alloy is superior in hydrogen embrittlement resistance, tensile strength, and a thermal conductive property. A beryllium copper alloy has a tensile strength higher (for example, about 1.5 to about 2.5 times higher) than that of stainless steel for high-pressure hydrogen and a thermal conductivity higher (for example, about 7 to about 16 times higher) than that of stainless steel in addition to being free from hydrogen brittleness (that is, having hydrogen embrittlement resistance), and therefore can make the size of a heat exchanger for high-pressure hydrogen outstandingly smaller (for example, about ¼ times smaller) than that of a heat exchanger for high-pressure hydrogen made of stainless steel, which cannot be achieved with low-purity copper and a copper alloy having a low strength.

CITATION LIST

Patent Literature

Patent Literature 1: JPH9-87780A
Patent Literature 2: JP2017-145472A

SUMMARY OF THE INVENTION

A heat exchanger of a pre-cooler for a hydrogen station has a structure formed by bonding multiple layers of metal sheets including a slit or a groove in order to form a flow passage to allow hydrogen and a refrigerant to pass. As a currently adopted method for bonding stainless steel for high-pressure hydrogen, diffusion bonding is widely known in which an oxide film of the surface layer is removed by sublimation in a pressure reducing and temperature increasing process to a bonding temperature, and pressure for adhesion is applied to a bonding part at a high temperature equal to or lower than the melting point to bond the stainless steel sheets. However, with regard to a copper alloy, (i) the copper alloy has a strong oxide film that is not easily removed by simple pressure reduction and temperature increase and/or (ii) even if an oxide film is removed before bonding, an oxide film is also likely to be formed again in a bonding surface (adhesion surface) during temperature increase under high vacuum in a bonding step (besides, the oxide film is unlikely to be sublimated even when the temperature becomes close to the bonding temperature). When diffusion bonding is performed on such a copper alloy in a similar step, a certain bonding strength is secured, but it has been difficult to obtain a texture and strength equal to those of a base material. Particularly, to realize a copper alloy member having an extremely high strength required in uses of the above-described heat exchanger for high pressure, solution annealing and an aging treatment need to be performed on an age-hardenable copper alloy. However, there has been a problem that a diffusion-bonded body of an age-hardenable copper alloy in which a sufficient bonding strength is not secured cannot withstand severe thermal shock or dimensional fluctuation accompanying the solution annealing and the aging treatment and is broken at a bonding part.

The present inventors have now found that in the case of selectively adopting an age-hardenable copper alloy of which the beryllium content is 0.7% by weight or less, finishing a bonding part to a predetermined flatness to remove an oxide film, and then performing diffusion bonding (and, if necessary, homogenization treatment), it is possible to perform solution annealing and an aging treatment in such a way as to allow a bonding interface to disappear (or otherwise to make the thickness of an oxide film at the bonding interface 5.0 nm or less), and thereby to provide a copper alloy bonded body having an extremely high bonding strength.

Accordingly, an object of the present invention is to provide a bonded body of an age-hardenable copper alloy which has withstood solution annealing and an aging treatment after a bonding treatment and thereby realized an extremely high bonding strength.

According to an aspect of the present invention, there is provided a copper alloy bonded body composed of a plurality of members made of an age-hardenable copper alloy, the members diffusion-bonded to one another, wherein the copper alloy bonded body has undergone solution annealing and an aging treatment, wherein the content of beryllium in the age-hardenable copper alloy is 0.7% by weight or less, and wherein:
(i) a bonding interface between the members has disappeared and/or
(ii) a bonding interface between the members remains, and an oxide film at the bonding interface has a thickness of 0 nm or more and 5.0 nm or less.

According to another aspect of the present invention, there is provided a method for producing the copper alloy bonded body, comprising the steps of:

providing a plurality of members made of an age-hardenable copper alloy, wherein each surface to be bonded is a flat surface having a flatness of 0.1 mm or less and a ten-point average roughness Rzjis of 6.3 μm or less, and wherein the content of beryllium is 0.7% by weight or less;

removing an oxide film present at each surface to be bonded of a plurality of the members;

subjecting a plurality of the members to diffusion bonding by hot pressing to provide an intermediate bonded body;

subjecting the intermediate bonded body to solution annealing including heating at a temperature of 700 to 1100° C. for 1 to 180 minutes and subsequent water cooling; and subjecting the solution-annealed intermediate bonded body to an aging treatment at 350 to 550° C. for 30 to 480 minutes.

According to another aspect of the present invention, there is provided a hydrogen-resistant member composed of Corson copper (EN material number CW109C, CW111C, UNS alloy number C19010, C70250, AMPCO944, and AMPCO940). Alternatively, there is provided use of Corson copper in a hydrogen-resistant member or a method for producing a hydrogen-resistant member including using Corson copper. The present inventors have now confirmed that Corson copper does not cause hydrogen embrittlement to occur even under high-pressure hydrogen.

BRIEF DESCRIPTION OF THE DRAWINGS

FIG. 1B shows results of XPS for beryllium copper alloy 25, beryllium copper alloy 165, beryllium copper alloy 11, beryllium copper alloy 10Zr, beryllium copper alloy 50, and chromium copper alloy.

FIG. 1C shows results of XPS for Corson copper AMPCO940 and Corson copper AMPCO944.

DETAILED DESCRIPTION OF THE INVENTION

Copper Alloy Bonded Body

Figure 1A:
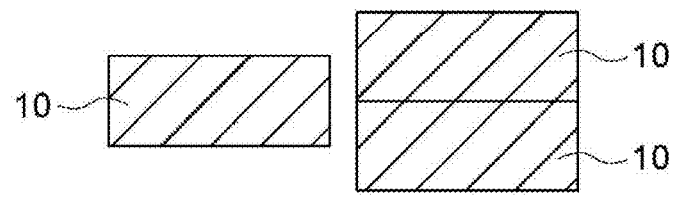
FIG. 1A is a diagram for describing procedures of an experiment of performing elemental analysis of oxide films formed on surfaces of copper alloys in a thermal treatment in a high-vacuum furnace, and conceptually shows progress of oxidation, and shows positions of an in-furnace open surface and a close contact surface where the elemental analysis is performed, and appearances of samples.
Figure 1A:
Figure 1A:
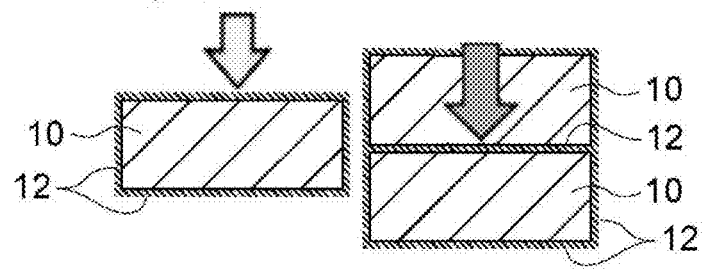
Figure 1A:
Figure 1A:
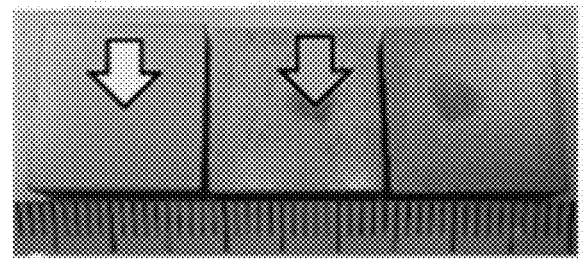

A copper alloy bonded body of the present invention is composed of a plurality of members made of an age-hardenable copper alloy, the members diffusion-bonded to one another, wherein the copper alloy bonded body has undergone solution annealing and an aging treatment. The content of beryllium in the age-hardenable copper alloy is 0.7% by weight or less. In this copper alloy bonded body, (i) a bonding interface between the members has disappeared and/or (ii) a bonding interface between the members remains, and an oxide film at the bonding interface has a thickness of 0 nm or more and 5.0 nm or less. In this way, in the case of selectively adopting the age-hardenable copper alloy of which the beryllium content is 0.7% by weight or less and performing the solution annealing and the aging treatment (after performing a homogenization treatment as necessary) in such a way as to allow the bonding interface to disappear (or otherwise to make the thickness of the oxide film at the bonding interface 5.0 nm or less), it is possible to provide a copper alloy bonded body having an extremely high bonding strength.

As described above, when diffusion bonding is performed, in a similar step, on the copper alloy wherein (i) the copper alloy has a strong oxide film that is not easily removed by simple pressure reduction and temperature increase and/or (ii) an oxide film is also likely to be formed again under high vacuum, a certain bonding strength is secured, but it has been difficult to obtain a texture and strength equal to those of a base material. Particularly, to realize a copper alloy member having an extremely high strength required in uses of the above-described heat exchanger, solution annealing and an aging treatment need to be performed on an age-hardenable copper alloy, but there has been a problem that a diffusion-bonded body of an age-hardenable copper alloy cannot withstand severe thermal shock or dimensional fluctuation accompanying the solution annealing and the aging treatment and is broken at a bonding part.

In this regard, according to the constitution of the present invention, such problems are conveniently solved and a copper alloy bonded body having an extremely high bonding strength can be provided. The reason is as follows, as made clear in confirmation tests conducted by the present inventors, which will be described later. That is, the age-hardenable copper alloy in which the content of beryllium is 0.7% by weight or less is selectively adopted, the flatness and surface roughness of each bonding surface are adjusted in such a way as to be suitable for diffusion bonding and an oxide film at the bonding surface is then removed, bonding interfaces of copper alloy members are brought into contact with each other, and the pressure is applied and the temperature is increased to perform diffusion bonding. In this case, an oxide film at the bonding surface, which is formed in an age-hardenable copper alloy in which the content of beryllium is more than 0.7% by weight, is not formed or formed only extremely slightly, and therefore high-quality diffusion bonding that is sufficiently bearable to solution annealing and an aging treatment is realized.

It is known that stainless steel, pure copper, and the like can be bonded with high reliability by diffusion bonding. Stainless steel has strong weatherability because a dense chromium oxide film as the surface layer formed under the air serves as a protecting film, but this oxide film is sublimated when heated at a temperature higher than 700° C. under high vacuum. Therefore, the oxide film is naturally removed during temperature increase in diffusion bonding and a surface of active stainless steel whose surface layer is free from an oxide film is easily obtained, so that favorable bonding such that an oxide and another foreign material do not remain at the bonding interface can be performed only by pressurization at a bonding temperature. In addition, pure copper has a copper oxide (CuO) film as the surface layer, but the oxide decomposes and oxygen diffuses into the copper matrix during the time when the temperature is kept at a diffusion bonding temperature, and therefore favorable bonding such that an oxide and another foreign material do not remain at the bonding interface can be performed on pure copper as well as stainless steel.

Figure 1B:
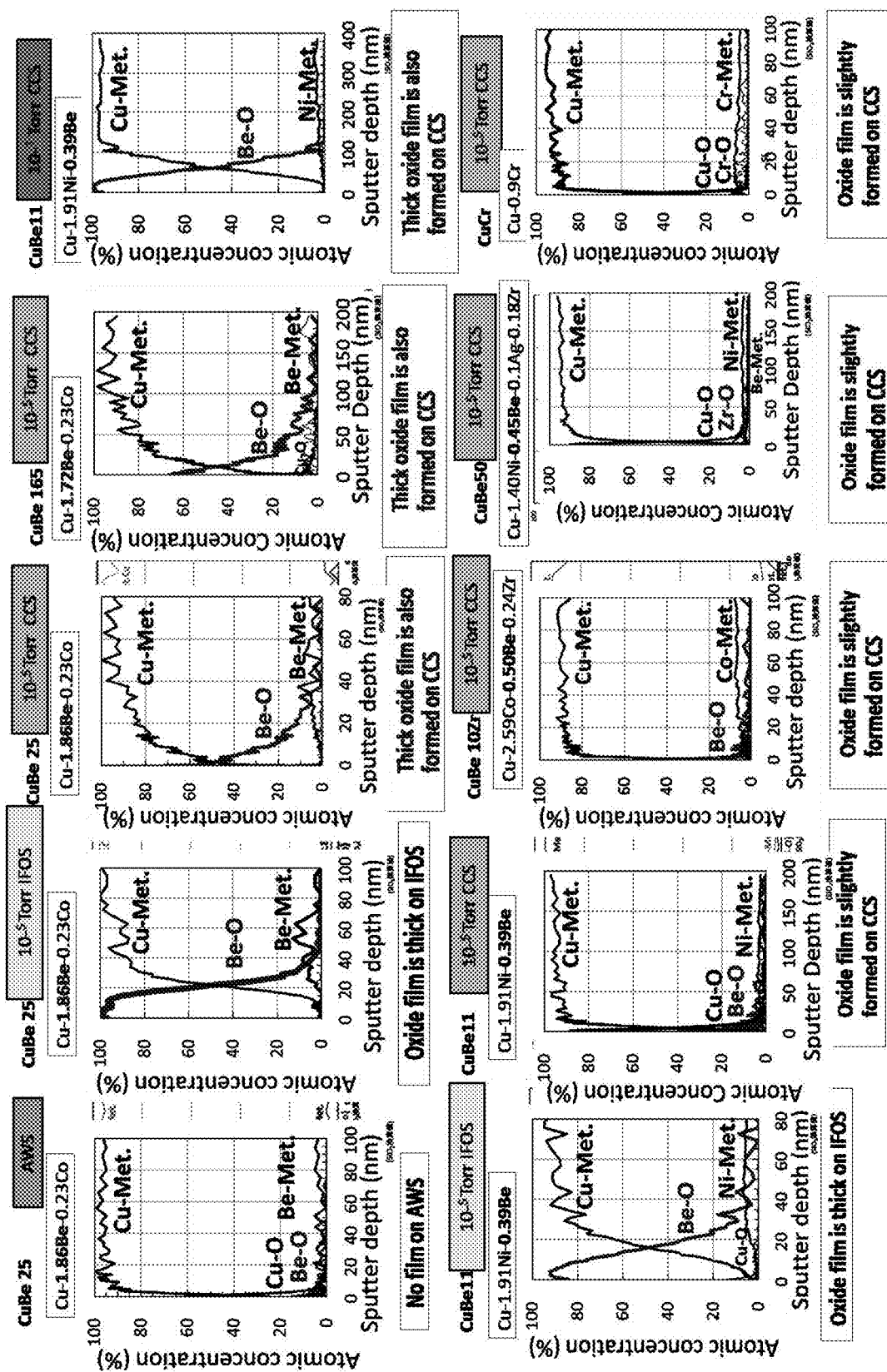
FIG. 1B shows results of the elemental analysis of the oxide films formed on the surfaces (acid-washed surface, in-furnace open surface and/or close contact surface) of the copper alloys when the thermal treatment was performed in the high-vacuum furnace according to the procedures of the experiment shown in FIG. 1A. Specifically.
Figure 1C:
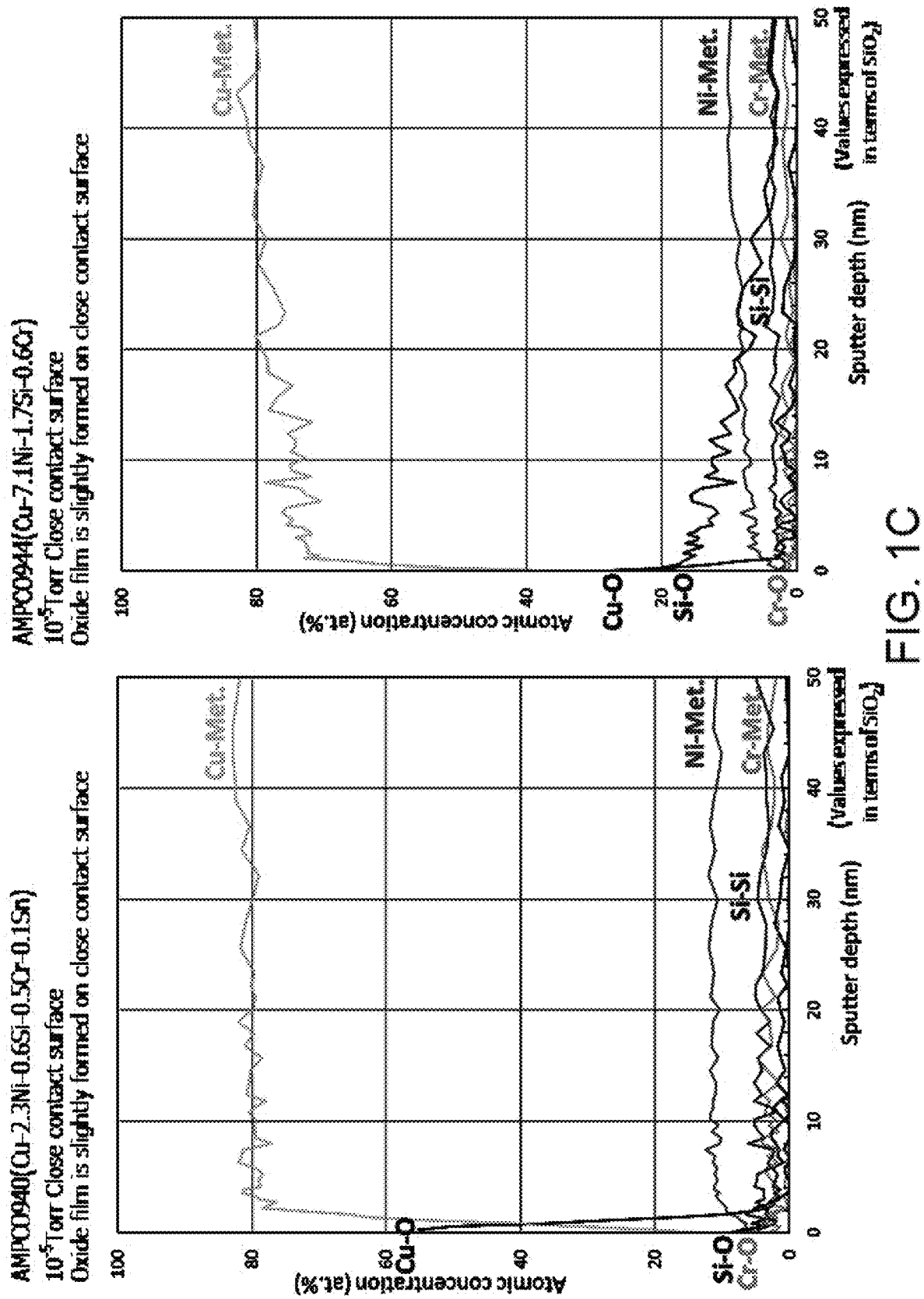
FIG. 1C shows results of the elemental analysis of the oxide films formed on the surfaces (acid-washed surface, in-furnace open surface and/or close contact surface) of the copper alloys when the thermal treatment was performed in the high-vacuum furnace according to the procedures of the experiment shown in FIG. 1A. Specifically.

The present inventors have confirmed in the tests prior to the completion of the present invention that when conventionally known diffusion bonding is performed on an age-hardenable copper alloy, a certain bonding strength is obtained, but when solution annealing and aging treatment are performed on a resultant bonded body, the bonding strength is deteriorated and the bonded body is broken in many cases. This phenomenon is remarkable for beryllium copper alloy 25 (JIS C1720), which is known as providing the highest strength among age-hardenable copper alloys. The present inventors have inferred that the cause of this is an oxide film which is not recognized in stainless steel and pure copper and which remains at a bonding surface, and have conducted the following experiment as shown in FIG. 1A in order to clarify the mechanism that allows the oxide film to remain. Each alloy shown in FIGS. 1B and 1C is processed into a plate shape whose size is 15 mm×15 mm×5 mm, the top and bottom surfaces having a size of 15 mm×15 mm of a resultant specimen 10 are then lapped and flattened to make the flatness 0.1 mm or less and make the surface roughness Rzjis 0.8 μm or less, and the specimen is then washed with 30% nitric acid to remove an oxide film immediately before the test is conducted. Three specimens 10 are prepared for each alloy. As shown in FIG. 1A, one of the specimens 10 is placed in a furnace for bonding in a condition of being in contact with a vacuum atmosphere in the furnace, and the other two specimens 10 are stacked and placed in the furnace for bonding in a condition of being in a close contact with each other (like the bonding surfaces in diffusion bonding). After a thermal treatment which is the same as that during diffusion bonding is performed in the furnace for bonding under various reduced pressure conditions, the specimens were taken out, and elemental analysis is performed for each oxide film 12 as the surface layer with an X-ray photoelectron spectrometer (XPS, product name: Quantera SXM, manufactured by ULVAC-PHI, Inc.) while a surface which was in contact with the in-furnace atmosphere (hereinafter, referred to as in-furnace open surface) is etched with argon for the former and each surface where the samples were in close contact with each other (hereinafter, referred to as close contact surface) is etched with argon for the latter.

FIGS. 1B and 1C show the measurement results for the oxide films of each alloy after the acid washing, after the thermal treatment of the in-furnace open surface, and/or after the thermal treatment of the close contact surfaces. These results show that the oxide films are completely removed by the acid washing in the tests for all the alloys and that a very thick oxide film is formed on each in-furnace open surface even under a high vacuum of $5 \times 10^{-5}$ Torr. With regard to the degree of oxide film formation on the close contact surface, which is an issue in bonding, the following have been confirmed:

i) when the alloys in which the content of beryllium is 0.7% by weight or less (beryllium copper alloy 11, beryllium copper alloy 50, beryllium copper alloy 10Zr, chromium copper alloy, Corson copper AMPCO940, and Corson copper AMPCO944) are treated at a bonding temperature under a high vacuum of $5 \times 10^{-5}$ Torr (the degree of vacuum that is achieved during continuous exhaust with a diffusion pump), an oxide film is not formed or is formed only very slightly, ii) even for the alloys in which the content of beryllium is 0.7% by weight or less, an oxide film can be formed at a degree of vacuum of about $1 \times 10^{-1}$ Torr due to oxygen which penetrates into the close contact surface, and iii) even when the alloys in which the content of beryllium is more than 0.7% by weight (beryllium copper alloy 25 and beryllium copper alloy 165) are treated under a high vacuum of $5 \times 10^{-5}$ Torr, an oxide film is formed due to oxygen which penetrates into the close contact surface. The above results show that beryllium has extremely high affinity to oxygen and therefore when the concentration of beryllium is a certain level or higher, it is difficult to suppress the oxide film formation due to oxygen which penetrates between close contact surfaces even if the degree of close contact between members is increased under a high degree of vacuum, so that the content of beryllium has to be taken into consideration in selecting materials in order not to allow the oxide film to remain at the bonding surface.

The age-hardenable copper alloy which is used for the copper alloy bonded body of the present invention is not particularly limited as long as the content of beryllium is 0.7% by weight or less. A bonded body using a beryllium copper alloy in which the content of Be is high, as high as more than 0.7% by weight, (for example, beryllium copper alloy 25 (JIS alloy number C1720)) cannot withstand solution annealing and an aging treatment because an oxide film at a bonding surface remains remarkably, and therefore is broken at the bonding surface after the solution annealing and the aging treatment. However, by performing diffusion bonding using selectively an age-hardenable copper alloy in which the content of Be is low, as low as 0.7% by weight or less, a copper alloy bonded body that withstands solution annealing and an aging treatment and has an extremely high bonding strength can be realized. Examples of the age-hardenable copper alloy include beryllium copper alloy 11 (JIS alloy number C1751, EN material number CW110C, and UNS alloy number C17510), beryllium copper alloy 10 (EN material number CW104C and UNS alloy number C17500), beryllium copper CuCo1Ni1Be (EN material number CW103C), beryllium copper alloy 14Z, beryllium copper alloy 50, beryllium copper alloy 10Zr, chromium copper (UNS alloy number C18200), chromium zirconium copper (UNS alloy number C18510 and EN material number CW106C), zirconium copper (UNS alloy number C15000, EN material number CW120C), and Corson copper (EN material number CW109C, CW111C, UNS alloy number C19010, C70250, AMPCO944, and AMPCO940), and the age-hardenable copper alloy is more preferably beryllium copper alloy 11, beryllium copper alloy 10, beryllium copper CuCo1Ni1Be, beryllium copper alloy 14Z, beryllium copper alloy 50, or beryllium copper alloy 10Zr, most preferably beryllium copper alloy 11. These preferred age-hardenable copper alloys can realize an extremely high bonding strength after solution aging, and is superior in a hydrogen-embrittlement-resistant property and a thermal conductive property as well, and is particularly advantageous as a material for a heat exchanger of a pre-cooler for a hydrogen station. The compositions of the above-described various copper alloys are shown in Table 1 below.

Table 1

TABLE 1

| | JIS Alloy number | UNS Alloy number | EN Material number | Essential elements (% by weight) | Optional elements (% by weight) | Balance |
|---|---|---|---|---|---|---|
| Beryllium copper alloy 11 | C1751 | C17510 | CW110C | Be:0.20~0.60, Ni:1.40~2.20 | Co:0~0.3, Fe:0~0.2 | Cu and Inevitable impurities |
| Beryllium copper alloy 10 | — | C17500 | CW104C | Be:0.40~0.70, Co:2.00~2.80 | Co:0~0.3, Fe:0~0.2 | |
| Beryllium copper CuCo1Ni1Be | — | — | CW103C | Be:0.4~0.7, Ni:0.8~1.3, Co:0.8~1.3, Fe:0~0.2 | — | |
| Beryllium copper alloy 14Z | — | — | — | Be:0.20~0.60, Ni: 1.40~2.40 | Zr:0~0.5 | |
| Beryllium copper alloy 50 | — | — | — | Be:0.20~0.60, Ni: 1.40~2.10, Ag:0.1~0.3 | Zr:0~0.5 | |
| Beryllium copper alloy 10Zr | — | — | — | Be:0.40~0.70, Co:2.00~2.80 | Zr:0~0.3 | |
| Chromium copper | — | C18200 | — | Cr:0.7~1.4 | — | |
| Chromium zirconium copper | — | C18510 | CW106C | Cr:0.5~1.2, Zr:0.03~0.3 | Si:0~0.1, Fe:0~0.08 | |
| Zirconium copper | — | C15000 | CW120C | Zr:0.1~0.2 | — | |
| Corson copper CuNi1Si | — | — | CW109C | Ni:1.0~1.6, Si:0.4~0.7 | Fe:0~0.2, Mn:0~0.1, Pb:0~0.02 | |
| Corson copper CuNi2Si | — | — | CW111C | Ni:1.6~2.5, Si:0.4~0.8 | Fe:0~0.2, Mn:0~0.1, Pb:0~0.02 | |
| Corson copper C1901 | — | C19010 | — | Ni:1.5~3.0, Si:0.5~1.5, Cr:0.1~1.5 | Sn:0.1-0.3 | |
| Corson copper C7025 | — | C70250 | — | Ni:2.2~4.2, Si:0.25~1.2, Mg:0.05~0.3 | Fe:0-0.2, Zn:0-1.0, Pb:0~0.05 | |

TABLE 1-continued

| | JIS Alloy number | UNS Alloy number | EN Material number | Essential elements (% by weight) | Optional elements (% by weight) | Balance |
|---|---|---|---|---|---|---|
| Corson copper AMPCO944 | — | — | — | Ni:6.5~7.5, Si: 1.5~2.5, Cr:0.5~1.5 | — | |
| Corson copper AMPCO940 | — | — | — | Ni:1.5~3.0, Si:0.5~1.5, Cr:0.3~1.5 | Sn:0~0.3 | |

Note)
In alloy standards of JIS, UNS, and EN, there are slight differences in upper and lower limit values of respective component standards and in specifications for optional elements, but control values for commercially produced alloys are substantially the same.

As described above, the copper alloy bonded body of the present invention, on which the solution annealing and the aging treatment have been performed, satisfies any one or both of the following conditions:
(i) a bonding interface between the members has disappeared, and
(ii) a bonding interface between the members remains, and an oxide film at the bonding interface has a thickness of 0 nm or more and 5.0 nm or less, and contributes to the realization of a high bonding strength. Whether the bonding interface has disappeared or remains is decided by observing a section including a bonding part of the copper alloy bonded body with an optical microscope at 200 to 1000 magnifications (see, for example, FIGS. 2 and 3). Whether the bonding interface has disappeared or remains should be decided according to whether the trace of the bonding surfaces of the copper alloy members before being bonded remains or not, and when a grain boundary derived from the bonding surfaces has moved due to grain growth beyond a bonding interface, the bonding interface is not decided as remaining. As a result, when a bonding interface of a plurality of members remains, the thickness of an oxide film at the bonding interface may be measured to decide whether or not the thickness of the oxide film is 0 nm or more and 5.0 nm or less. With regard to the thickness of the oxide film at the bonding interface, a section including the bonding interface is observed with a scanning transmission electron microscope (STEM) to acquire element mapping images at the section by electron energy loss spectroscopy (EELS)/energy dispersive X-ray analysis (EDX), the STEM image and the EELS/EDX element mapping images are compared, and thereby the oxide film can be specified and the thickness of the oxide film can be determined. Note that the oxide film present at the bonding interface is not always a layered film but a film of grains (that is, oxide grains) in some cases, and when the oxide film is a film of grains, the thickness of the oxide film includes the height of the oxide grains. In any case, whether the bonding interface is present or not can be confirmed with an optical microscope, and therefore the confirmation can be performed relatively simply and inexpensively, but on the other hand, STEM-EELS/EDX is an analysis method that is time-consuming and expensive. Accordingly, when whether the conditions (i) and/or (ii) are satisfied or not is decided, it is preferable to adopt the following scheme:
1) whether the condition (i) is satisfied or not is checked with an optical microscope (when the condition (i) is satisfied, checking the oxide film is unnecessary),
2) when the condition (i) is not satisfied, the thickness of the oxide film at the bonding interface is measured by STEM-EELS/EDX.

The oxide film that can be present at the bonding interface of the copper alloy bonded body of the present invention preferably has a thickness of 0 nm or more and 5.0 nm or less, preferably 0 nm or more and 4.0 nm or less, more preferably 0 nm or more and 3.0 nm or less, still more preferably 0 nm or more and 2.0 nm or less, particularly preferably 0 nm or more and 1.5 nm or less, most preferably 0 nm or more and 1.0 nm or less. Such a thin oxide film provides a copper alloy bonded body that withstands the solution annealing and aging treatment and has an extremely high bonding strength after the aging treatment in the case where the bonding interface remains as well as the case where the bonding interface has disappeared.

The copper alloy bonded body of the present invention can contain crystal grains of the age-hardenable copper alloy grown beyond the bonding interface or the position (former bonding interface) where the bonding interface was present. That is, the copper alloy bonded body of the present invention has, at the bonding interface or the former bonding interface, a structure formed in such a way that crystal grains which were present at the bonding surface of the copper alloy members before being bonded have recombined and recrystallized after bonding, and a phenomenon such that the bonding interface has changed from what it initially was at the time of bonding can be observed. The copper alloy bonded body, when having such a fine bonding structure, is more superior in bonding strength.

In the copper alloy bonded body of the present invention, a residual component derived from a material other than the age-hardenable copper alloy is preferably absent at the bonding interface or the position (former bonding interface) where the bonding interface was present from the viewpoint of securing a high bonding strength equal to the strength of the base material and a hydrogen-resistant property equal to that of the base material. Accordingly, the copper alloy bonded body of the present invention is desirably free from a bonding agent, such as a brazing filler metal, at the bonding interface. That is, the copper alloy bonded body of the present invention preferably consists of the age-hardenable copper alloy.

The base material and the bonding part of the copper alloy bonded body after the solution annealing and aging treatment preferably have a strength of 520 MPa or higher, more preferably 690 MPa or higher. The copper alloy bonded body having such a strength sufficiently satisfies criteria required in high-strength applications including uses of the copper alloy bonded body as a heat exchanger of a precooler for a hydrogen station. The strength is desired to be high, and therefore the upper limit value of the strength should not be specified, but the base material and the bonding part of the copper alloy bonded body of the present invention, in which the content of beryllium is 0.7% by weight or less, after the solution annealing and aging treatment typically have a strength of 895 MPa or lower. The strength of the base material and the bonding part of the copper alloy bonded body before and after the solution annealing and aging treatment can be measured by preparing a specimen in accordance with ASTM E8M Specimen 3 in such a way that the bonding part is at the central position of the specimen and performing a tensile test following the procedures in accordance with ASTM E8M on the specimen.

The thermal conductivity of the base material including the bonding part of the copper alloy bonded body is desired to be high. Thermal conductance as well as electrical conductance is energy transfer based on conduction electrons, therefore there is a correlation between the two called the Wiedemann-Franz law, and the thermal conductivity and the electrical conductivity that is more simply measurable can be mutually converted. The base material including the bonding part of the copper alloy bonded body preferably has a thermal conductivity (and a converted electrical conductivity) of 209 W/mK or more (50 IACS % or more in terms of electrical conductivity), more preferably 228 W/mK or more (55 IACS % or more in terms of electrical conductivity), still more preferably 246 W/mK or more (60 IACS % or more in terms of electrical conductivity). Such a high thermal conductivity is advantageous when the copper alloy bonded body is used for a heat exchanger in that the heat exchange efficiency is extremely high (for example, a SUS316L Ni equivalent product which is superior in a property to hydrogen and therefore currently used for a heat exchanger of a pre-cooler has a very low thermal conductivity, as low as 16 W/mK, and the poor heat exchange efficiency is an operational drawback.). The thermal conductivity is desired to be high, and therefore the upper limit value of the thermal conductivity should not be specified, but the base material that includes the bonding part of the copper alloy bonded body of the present invention, in which the content of beryllium is 0.7% by weight or less, and that can secure a strength of 520 MPa or higher for the base material and the bonding part typically has a thermal conductivity of 280 W/mK or less.

The copper alloy bonded body including the bonding part preferably has a tensile strength of 520 MPa or higher, more preferably 690 MPa or higher, in a hydrogen gas in a slow strain rate tensile (SSRT: Slow Strain Rate Tensile) test performed at a strain rate in a range of $5 \times 10^{-5}$ s$^{-1}$ or less (for example, $5 \times 10^{-5}$ s$^{-1}$). This copper alloy bonded body including the bonding part is superior in the hydrogen-embrittlement-resistant property and has a high tensile strength. This slow strain rate tensile test is performed in accordance with ASTM-G-142. The slow strain rate tensile test may be performed using, for example, a standard-size specimen (smooth specimen). Generally, with a smooth specimen, the sensitivity to hydrogen is evaluated by relative tensile strength RTS or relative reduction of area RRA obtained by dividing tensile strength or reduction of area in a hydrogen gas by tensile strength or reduction of area in a reference gas which is free from an influence of hydrogen. In the slow strain rate tensile test for a smooth specimen, measurement may be performed at a strain rate of, for example, $5 \times 10^{-5}$ s$^{-1}$. This slow strain rate tensile test is performed at a hydrogen gas pressure of 95 MPa or higher assuming a 70 MPa-class FCV (fuel cell vehicle) or hydrogen station. When the hydrogen gas pressure is higher, the amount of hydrogen which penetrates into a material increases more, and therefore the specimen is more likely to be susceptible to an influence due to hydrogen exposure and the hydrogen brittleness can be evaluated more properly. In the tests regarding the present application, the property to hydrogen has been evaluated using standard-size specimens (smooth specimens) by the relative tensile strength RTS or the relative reduction of area RRA.

As for the copper alloy bonded body including a bonding part, when the tensile strength is 520 MPa or higher, desirably 690 MPa or higher, in the slow strain rate tensile test, the relative reduction of area RRA is preferably 0.8 or more, more preferably 0.9 or more. In addition, the relative tensile strength RTS is preferably 0.8 or more, more preferably 0.9 or more. That the value of the tensile strength of the copper alloy bonded body including a bonding part is within the above-described range at normal temperature under the air or a hydrogen gas pressure of 95 MPa or higher and the RRA and RTS of the copper alloy bonded body including a bonding part also satisfy the values within the above-described ranges means that this copper alloy bonded body has a high strength and is superior in the hydrogen-embrittlement-resistant property, and therefore is particularly suitable for uses thereof as a heat exchanger of a pre-cooler for a hydrogen station. The tensile strength is desired to be high, and therefore the upper limit value of the tensile strength should not be specified, but the copper alloy bonded body of the present invention, in which the content of beryllium is 0.7% by weight or less, typically have a tensile strength of 895 MPa or lower at normal temperature under the air or a hydrogen gas pressure of 95 MPa or higher in the slow strain rate tensile test.

The copper alloy bonded body may include a flow passage space inside as one embodiment. In this case, the flow passage space can be utilized as an internal space for allowing a medium, such as hydrogen or a refrigerant, to pass. Accordingly, the copper alloy bonded body including a flow passage space can preferably be used for uses thereof as a heat exchanger of a pre-cooler for a hydrogen station, which is desired to include a plurality of flow passage spaces for allowing hydrogen and a refrigerant to pass respectively.

Production Method

The copper alloy bonded body of the present invention can be produced by sequentially performing smoothening (arbitrary step) of bonding surfaces as necessary, removing an oxide film, bonding by hot pressing (diffusion bonding), a homogenization treatment (arbitrary step) as necessary, solution annealing, and an aging treatment on a plurality of members made of an age-hardenable copper alloy. Specifically, the production method is as follows.

(a) Providing Copper Alloy Members

First of all, a plurality of members made of an age-hardenable copper alloy to be used for bonding is provided. As this age-hardenable copper alloy, an age-hardenable copper alloy that is as described above, wherein the content of beryllium is 0.7% by weight or less, can be used. As the uppermost surface material and lowermost surface materials of a stacked-and-bonded body to be produced as a heat exchanger, a rolled material or a forged material is preferably used, and as a plurality of laminating materials which are other than the uppermost surface material and lowermost surface materials and which have or do not have a cooling water passage inside, a rolled material is preferably used.

A copper alloy material which does not cause deterioration in properties due to hydrogen is preferably used for the copper alloy bonded body of the present invention. With regard to copper alloy materials, it has been known that the deterioration in properties to hydrogen is remarkable in, for example, cupronickel (Cu—10% to 30%) in which the concentration of Ni is 20% or more and that the deterioration in properties to hydrogen also remarkably occurs in tough pitch copper (undeoxidized pure copper). Thus, desirably, in selecting a copper alloy which is used for the copper alloy bonded body of the present invention, a slow strain rate tensile test (for example, at a displacement rate of 0.001 mm/sec (a strain rate of 0.00005/sec) for smooth specimens in accordance with ASTM-G-142), is performed in each of the atmospheres in the air and under high-pressure hydrogen (for example, in 95 MPa hydrogen), and test result in the air and the test result under high-pressure hydrogen are compared to thereby confirm that the copper alloy is a copper alloy material which does not cause deterioration under hydrogen. For example, the copper alloy bonded body of the present invention is preferably prepared using a copper alloy member having an RRA (relative reduction of area) of 0.8 or more, more preferably 0.9 or more, in a hydrogen gas, measured in the slow strain rate tensile test performed at a strain rate of $5 \times 10^{-5}$ $s^{-1}$ or less.

A plurality of the members made of an age-hardenable copper alloy to be used for bonding need to have a flat surface to be bonded having a flatness of 0.1 mm or less and a ten-point average roughness Rzjis of 6.3 μm or less (preferably 2.0 μm or less). That is, as described above, to suppress the re-oxidation on the bonding surfaces in bonding by hot pressing (diffusion bonding) even though an oxide film on each surface of bonding members is removed, the close contact property between the bonding surfaces needs to be secured in such a way that oxygen atoms which penetrate into the bonding surfaces sufficiently decrease even under a high-vacuum atmosphere, and this close contact property can be secured when the bonding surfaces have a flatness and a ten-point average roughness within the above-described ranges. When the members to be bonded are rolled materials, the rolled materials satisfy the flatness and the ten-point average roughness within the above-described ranges in many cases, and therefore a special smoothening step is unnecessary. On the other hand, when the flatness and the ten-point average roughness within the above-described ranges are not satisfied, flat surfaces having a flatness and a ten-point average roughness within the above-described ranges are formed by polishing, cutting, and/or another method. Note that curl or the like is seen for a plate material in some cases, which is not a problem as long as the plate thickness accuracy is favorably adjusted, and, in applying a necessary load in bonding by hot pressing (diffusion bonding), the flatness is 0.1 mm or less and an intended close contact property can be secured. Note that the ten-point average roughness Rzjis is the surface roughness specified in JIS B 0601-2001. In addition, the flatness herein is a parameter defined as "magnitude of deviation in a planar form from a geometrically correct plane (geometric plane)" in JIS B 0621-1984, and when an object is sandwiched by a pair of planes, the flatness means a value of the width of the object.

Prior to removing the oxide film, which is a step that follows, a groove that provides a flow passage space after bonding is preferably formed as necessary on each surface to be bonded of a plurality of the members. The formation of the groove may be performed by any of various known methods, such as etching, press working, and mechanical processing. When such a groove is formed, thereby the members can be used for producing a copper alloy bonded body including a flow passage space inside, as described above. For example, copper ally plates with a groove and copper alloy plates without a groove are alternately stacked, and the copper alloy plates are bonded, thereby making it possible to produce a copper alloy laminated body in which many flow passages are formed. The multilayer bonded body having such a configuration can preferably be used for uses thereof as a heat exchanger of a pre-cooler for a hydrogen station, which is desired to include a plurality of flow passage spaces for allowing hydrogen and a refrigerant to pass respectively.

(b) Removing Oxide Film

As described above, an oxide film is present at each surface of the copper alloy members. Therefore, the oxide film present at each surface to be bonded of the copper alloy members is removed. Removing the oxide film is preferably performed by washing the surface to be bonded of the copper alloy members with an inorganic acid solution in that the oxide film can be removed effectively. Examples of the inorganic acid solution include nitric acid, sulfuric acid, a chemical polishing solution, hydrochloric acid, a kirinsu bath, and hydrofluoric acid, and the inorganic acid solution is particularly preferably a nitric acid. Note that the chemical polishing solution is an acid obtained by adding hydrogen peroxide that is an oxidizing agent to sulfuric acid, and the kirinsu bath is a mixed acid of sulfuric acid, nitric acid, and hydrochloric acid, in which a small amount of sodium hydroxide is added in some cases. Examples of preferred mixing ratios in the kirinsu bath include sulfuric acid:nitric acid:hydrochloric acid=61:4:4, 81:1:0.02, or 11:1:0.02. Alternatively, removing the oxide film may also be performed by mechanical polishing, or by a combination of mechanical polishing and washing with an inorganic acid solution.

(c) Bonding by Hot Pressing (Diffusion Bonding)

A plurality of the copper alloy members is bonded by hot pressing to make an intermediate bonded body. This bonding can be performed in accordance with a diffusion bonding method. For example, the hot pressing is preferably performed by applying a pressure of 1.0 MPa or higher at a temperature of 500 to 1050° C. for 30 to 480 minutes in a furnace wherein a degree of vacuum is higher than $1.0 \times 10^{-2}$ or higher (that is, pressure is lower than $1.0 \times 10^{-2}$ Torr). However, when the age-hardenable copper alloy is free of Be (for example, Corson copper), the hot pressing can be performed by applying a pressure of 1.0 MPa or higher at a temperature of 500 to 1050° C. for 30 to 480 minutes in a furnace wherein a degree of vacuum is higher than $1.0 \times 10^{-1}$ or higher (that is, pressure is lower than $1.0 \times 10^{-1}$ Torr). In any case, this hot pressing is performed in such a way that the amount of deformation in length of each copper alloy member in the direction of pressurization during bonding is preferably 0.5% or more and 30% or less, more preferably 1% or more and 20% or less, still more preferably 2% or more and 8% or less. There are proper combinations in the hot-pressing temperature and pressure, and the combination is preferably such that when the temperature is higher than 840° C. and 1050° C. or lower, the pressure is 1 MPa or higher and 16 MPa or lower, when the temperature is higher than 720° C. and 840° C. or lower, the pressure is 2 MPa or higher and 24 MPa or lower, and when the temperature is 600° C. or higher and 720° C. or lower, the pressure is 4 MPa or higher and 50 MPa or lower. The time for the hot pressing is preferably 15 to 480 minutes, more preferably 30 to 150 minutes, still more preferably 30 to 60 minutes. Note that the degree of vacuum in the furnace during the hot pressing is preferably lower than $1.0 \times 10^{-3}$ Torr, more preferably lower than $1.0 \times 10^{-4}$ Torr, still more preferably lower than $5.0 \times 10^{-5}$ Torr, from the viewpoint of suppressing progress of oxidation.

Particularly when a groove is formed on the surface of the copper alloy member to allow the intermediate bonded body to have a flow passage space, the hot pressing is preferably performed at a relatively low temperature and a relatively high pressure in that the hot pressing can be controlled in such a way as to make crush of the flow passage due to the pressing slight. Specifically, the hot pressing in this aspect is preferably performed in a furnace wherein the degree of vacuum is higher than $1.0 \times 10^{-2}$ Torr (that is, pressure is lower than $1.0 \times 10^{-2}$ Torr), more preferably in a furnace wherein the degree of vacuum is higher than $1.0 \times 10^{-4}$ Torr (that is, pressure is lower than $1.0 \times 10^{-4}$ Torr), by
   (i) applying a pressure of 1 MPa or higher and 4 MPa or lower at a temperature of higher than 840° C. and 930° C. or lower for 30 to 480 minutes (preferably 30 to 60 minutes),
   (ii) applying a pressure of 2 MPa or higher and 8 MPa or lower at a temperature of higher than 720° C. and 840° C. or lower for 30 to 480 minutes (preferably 30 to 60 minutes), or
   (iii) applying a pressure of 4 MPa or higher and 30 MPa or lower at a temperature of 600° C. or higher and 720° C. or lower for 30 to 480 minutes (preferably 30 to 60 minutes).

(d) Homogenization Treatment (Arbitrary Step)

When a groove is formed on the surface of the copper alloy member to allow the intermediate bonded body to have a flow passage space and the hot pressing is performed at a relatively low temperature and a relatively high pressure, it is preferable to perform, prior to the solution annealing, on the intermediate bonded body, a homogenization treatment at a temperature of 900 to 1050° C. for 60 to 480 minutes in a furnace wherein a degree of vacuum is preferably higher than $1.0 \times 10^{-1}$ Torr (that is, pressure is lower than $1.0 \times 10^{-1}$ Torr) or in a furnace preferably under an atmosphere (inert atmosphere) of nitrogen or another non-oxidizing gas (at normal pressure or reduced pressure). The homogenization treatment is a treatment also called homogenization annealing, but the term of homogenization treatment is used herein. That is, when the hot pressing is performed at a relatively low temperature and a relatively high pressure, bonding interfaces are likely to remain, but performing the homogenization treatment enables reduction or disappearance of the bonding interfaces, and through the subsequent solution annealing and aging treatment, an extremely high bonding strength can be realized. That is, both suppression of crush of a flow passage and high bonding strength can be realized. The homogenization treatment is preferably performed in the air atmosphere wherein the pressure is lower than $1.0 \times 10^{-1}$ Torr or lower, or at normal pressure, or in an inert atmosphere, such as in nitrogen, wherein the pressure is reduced to lower than $1.0 \times 10^{-1}$ Torr, in order to suppress progress of oxidation. The homogenization treatment temperature is preferably 900 to 1050° C., more preferably 930 to 1000° C., still more preferably 960 to 990° C. The holding time at the homogenization treatment temperature is 60 to 480 minutes, more preferably 60 to 360 minutes, still more preferably 60 to 240 minutes. It is needless to say that even when grooves are not formed on the surfaces of the copper alloy members, the homogenization treatment may be performed as necessary.

Note that the bonding by hot pressing (diffusion bonding) (c) and the homogenization treatment (d) are preferably performed continuously by releasing a pressing load without decreasing the temperature in the furnace; and increasing the temperature. When (c) and (d) are performed in such a manner, thereby the bonding by hot pressing (diffusion bonding) and the homogenization treatment can be performed as a series of continuous operations without performing pressurization to crush a flow passage space in such a way that the homogenization treatment at a temperature effective for homogenization of textures can be performed after the bonding by hot pressing (diffusion bonding) is performed under a temperature and pressurization condition not to crush a flow passage space excessively, which is advantageous not only from the viewpoint of improving reliability of the bonding parts but also from the economical viewpoint.

(e) Solution Annealing

The solution annealing is performed on the intermediate bonded body. This solution annealing is preferably performed by heating the intermediate bonded body in a furnace, such as an atmospheric furnace, a non-oxidizing atmospheric furnace, or a salt bath furnace, at a temperature of 700 to 1100° C. for 1 to 180 minutes, and then cooling the intermediate bonded body with water. The copper alloy which is used in the present invention is an age-hardenable alloy and can exhibit optional tempered properties (for example, a high strength), especially an extremely high bonding strength, through the solution annealing and the subsequent aging treatment which are performed after the bonding interface is made to disappear or the thickness of the oxide film at the bonding interface is adjusted to a certain level or lower. The solution annealing temperature is preferably 700 to 1100° C., more preferably 800 to 1050° C., still more preferably 900 to 1000° C., although the proper region is somewhat different depending on the alloy composition. The substantial holding time at the solution annealing temperature is preferably 1 to 180 minutes, more preferably 5 to 90 minutes, still more preferably 10 to 60 minutes.

(f) Aging Treatment

The aging treatment is performed on the solution-annealed intermediate bonded body. This aging treatment is preferably performed at 350 to 550° C. for 30 to 480 minutes although the proper range is somewhat different depending on the alloy composition. As described above, the age-hardenable alloy, such as a beryllium copper alloy, can exhibit optional tempered properties (for example, a high strength), especially an extremely high bonding strength, through the solution annealing and the aging treatment. The aging treatment temperature is preferably 350 to 550° C., more preferably 400 to 500° C., still more preferably 450 to 480° C. The holding time at the aging treatment temperature is preferably 30 to 480 minutes, more preferably 30 to 300 minutes, still more preferably 60 to 240 minutes, particularly preferably 90 to 180 minutes. From the viewpoint of suppression of oxidation, the aging treatment is preferably performed in a furnace wherein the degree of vacuum is higher than $1.0 \times 10^{-1}$ Torr (that is, pressure is lower than $1.0 \times 10^{-1}$ Torr) or in a furnace under a non-oxidizing atmosphere, such as nitrogen.

Hydrogen-Resistant Member

According to another aspect of the present invention, there is provided a hydrogen-resistant member composed of Corson copper (EN material number CW109C, CW111C, UNS alloy number C19010, C70250, AMPCO944, and AMPCO940). The hydrogen-resistant member of the present aspect is not limited to the copper alloy bonded body as described above and can be any of copper alloy products in various forms. That is, as will be demonstrated in Examples below, Corson copper also has a hydrogen-embrittlement-resistant property and therefore has a utility value as a hydrogen-resistant member. Corson copper in particular has an advantage of capable of stably producing a product accompanied by bonding and therefore is advantageous in that a product made of a hydrogen-resistant member can be supplied stably. The hydrogen-resistant member is defined as a member that is used in a state of coming into contact with hydrogen. Example of the use of the hydrogen-resistant member include a storage member that stores hydrogen, a heat exchange member (for example, a heat exchanger) that circulates hydrogen to perform heat exchange, a piping member that circulates hydrogen, a valve member to be connected to a piping member that circulates hydrogen, a seal member to be connected to a piping member that circulates hydrogen, and combinations thereof. This hydrogen-resistant member can be used in a state of coming into in contact with medium-pressure hydrogen of, for example, 30 MPa or higher, or 45 MPa or higher, or high-pressure hydrogen of, for example, 70 MPa or higher, or 90 MPa or higher. The hydrogen-resistant member may be used in, for example, a hydrogen station or a fuel cell vehicle (FCV) that handles high-pressure hydrogen.

EXAMPLES

The present invention will be described more specifically by the following Examples.

Examples 1 to 57

Copper alloy bonded bodies were prepared according to the following procedures to perform evaluations.
(1) Providing Copper Alloys For each Example, provided was a plurality of copper alloy round bars of the alloy types and compositions shown in Tables 2A, 3A, 4A, and 5A and of a size of 32 mm in diameter×50 mm in length or 80 mm in diameter×50 mm in length.

In Examples 1 to 40 and 43 to 57, each end surface (hereinafter, referred to as bonding surface) to be used for bonding the copper alloy round bars was made into a flat surface having a ten-point average roughness Rzjis of less than 6.3 μm, measured in accordance with JIS B 0601-2001, and having a flatness of 0.1 mm or less, measured in accordance with JIS B 0621-1984 by processing, such as lathe machining or lapping.

On the other hand, as for Example 41, each bonding surface of two copper alloy round bars was intentionally adjusted in such a way as to be made into a flat surface having a flatness of 0.1 mm or less, measured in accordance with JIS B 0621-1984 but having a ten-point average roughness Rzjis of larger than 6.3 μm. Further, as for Example 42, each bonding surface of two copper alloy round bars was intentionally adjusted in such a way as to have a ten-point average roughness Rzjis of smaller than 6.3 μm, measured in accordance with JIS B 0601-2001, but having a flatness of larger than 0.2 mm, measured in accordance with JIS B 0621-1984.
(2) Removing Oxide Film (Excluding Example 36)

In Examples 1 to 35, 37 to 48, and 50 to 53, each bonding surface of two of the copper alloy round bars was washed with 30% nitric acid to remove an oxide film present at the bonding surface. In Example 55, each bonding surface of two of the copper alloy round bars was washed with a chemical polishing solution (20% sulfuric acid containing 3% of hydrogen peroxide water) to remove an oxide film present at the bonding surface. In Examples 49, 54, and 56, each bonding surface of two of the copper alloy round bars was mechanically polished with emery paper #600 to remove an oxide film present at the bonding surface. In Example 57, each bonding surface of two of the copper alloy round bars was mechanically polished with buff #320 (nylon/polyester nonwoven fabric) to remove an oxide film present at the bonding surface. Note that in Example 36 (comparative example), removing an oxide film was not performed.
(3) Hot Pressing Bonding surfaces of two copper alloy round bars washed with nitric acid was made to directly butt against each other (without interposing a brazing filler metal) to perform hot pressing in a vacuum furnace under bonding conditions shown in Tables 2A, 3A, 4A, and 5A to provide intermediate bonded body in the form of a round bar. The amount of deformation D during bonding on that occasion was determined by the following formula:

$$D=[(L_0-L_1)/L_0]\times 100$$

assuming the integrated length in the boding direction of the two samples before bonding to be $L_0$ and assuming the length in the bonding direction of the samples after bonding to be $L_1$, and the results were as shown in Tables 2A, 3A, 4A, and 5A. For each Example, in order to perform respective evaluations, a plurality of tensile test specimens was prepared, and samples for observing a texture before and after the thermal treatment were prepared from the positions adjacent to the tensile test specimens.
(4) Solution Annealing Solution annealing was performed on the intermediate bonded bodies. This solution annealing was performed by holding the copper alloy bonded bodies in a molten salt bath at 930° C. for 5 minutes (in Examples 1 to 42 and 47 to 57) or at 780° C. for 5 hours (in Examples 43 to 46) and then cooling the copper alloy bonded bodies with water.
(5) Aging Treatment An aging treatment was performed on the solution-annealed intermediate bonded bodies. This aging treatment was performed by holding the copper alloy bonded bodies in a vacuum furnace wherein the degree of vacuum was $1\times10^{-1}$ Torr at 450° C. for 3 hours (in Examples 1 to 42 and 55 to 57), at 320° C. for 3 hours (in Examples 43 to 46), or at 500° C. for 2 hours (in Examples 47 to 54), and then cooling the copper alloy bonded bodies in the furnace. Thus, copper alloy bonded bodies in the form of a round bar, tempered by the solution annealing and the aging treatment, were provided.
(6) Evaluations The following evaluations were performed for the intermediate bonded bodies as bonded by the hot pressing, the copper alloy bonded bodies as solution-annealed, the copper alloy bonded bodies subjected to the solution annealing and the aging treatment, and/or the copper alloy bonded bodies subjected to the solution annealing and the aging treatment which were performed after the homogenization treatment was performed on the intermediate bonded bodies under various temperature and time conditions (hereinafter, there are collectively referred to as bonded body samples).
<Bonding Strength>

Each bonded body sample was processed to prepare a specimen in accordance with ASTM E8M Specimen 3 in such a way that the bonding part was at the central position of the specimen. A tensile test was performed on this specimen in accordance with ASTM E8M to measure the tensile strength (bonding strength), and then the breaking position was checked. The results were as shown in Table 2A to Table 5C.
<Observation of Section of Bonding Part with Optical Microscope>

Figure 2:
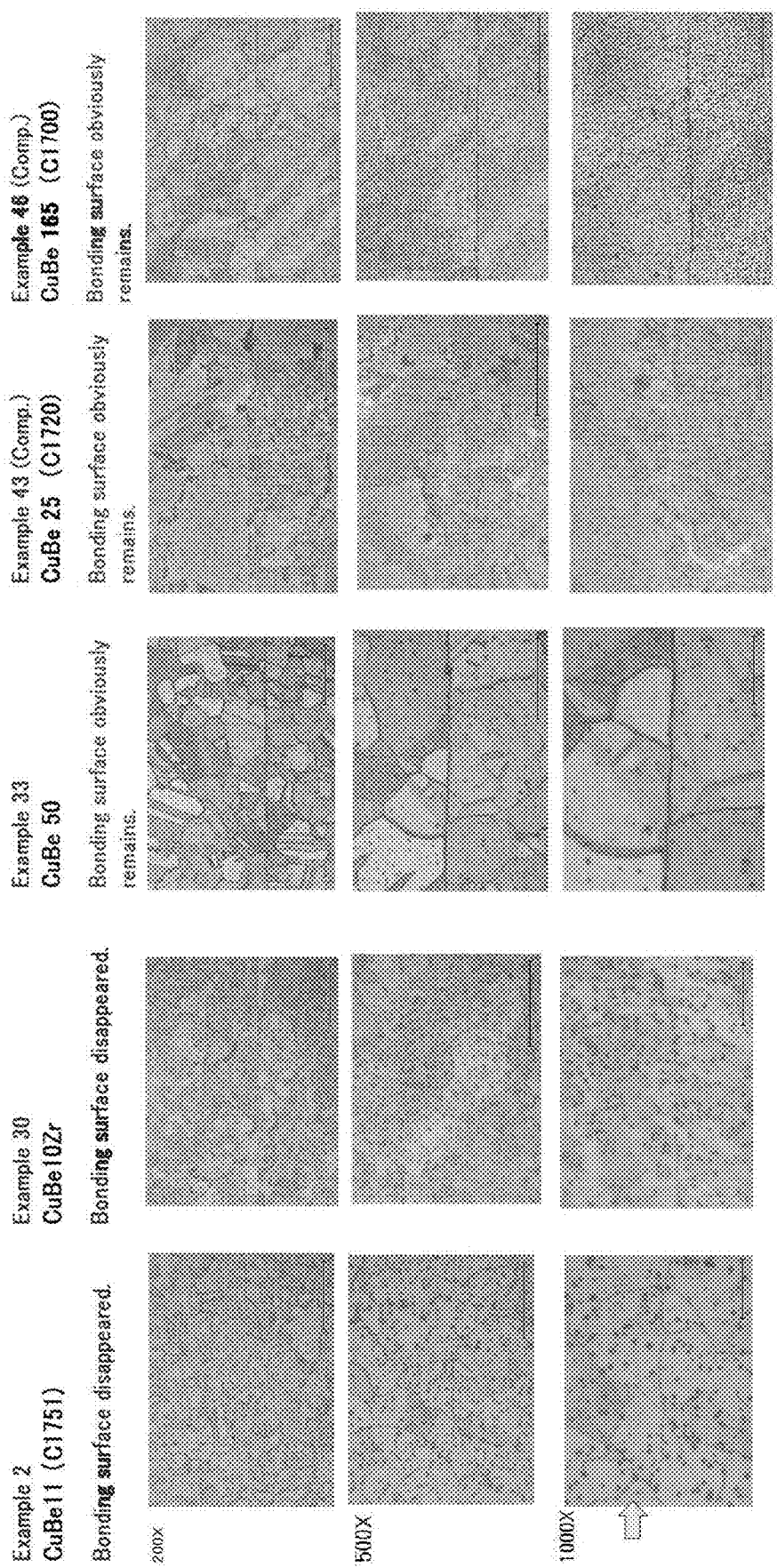
FIG. 2 shows optical microscope images taken at 200 magnifications, 500 magnifications, and 1000 magnifications, obtained by observing each section including a bonding part of copper alloy bonded bodies of Examples 2, 30, 33, 43, and 46 prepared through solution annealing and an aging treatment.
Figure 3:
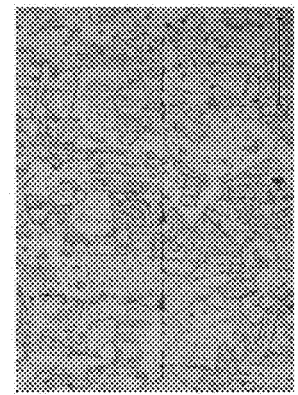
FIG. 3 shows optical microscope images taken at 200 magnifications, 500 magnifications, and 1000 magnifications, obtained by observing each section including a bonding part of copper alloy bonded bodies of Examples 26, 27, and 28 prepared through solution annealing and an aging treatment.
Figure 3:
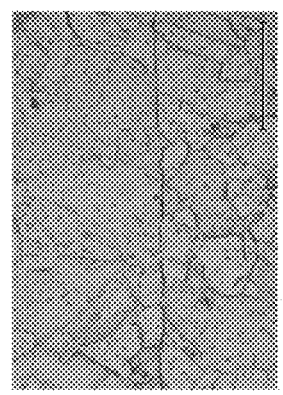
Figure 3:
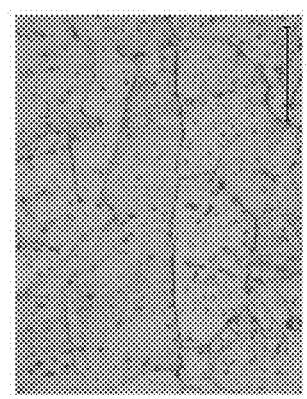
Figure 3:
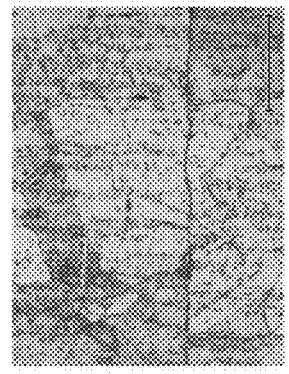
Figure 3:
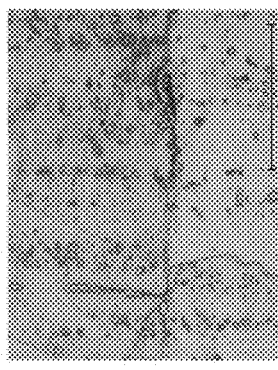
Figure 3:
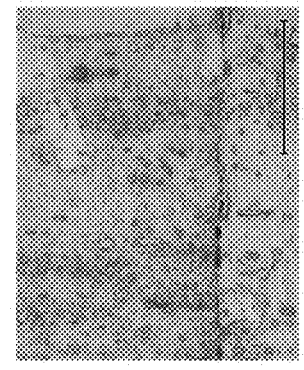
Figure 3:
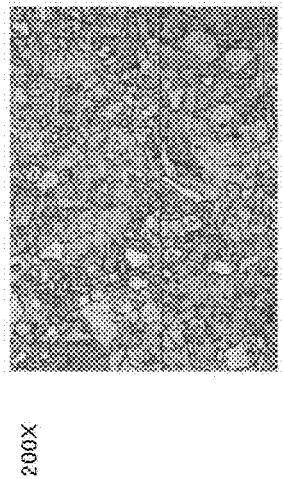
Figure 3:
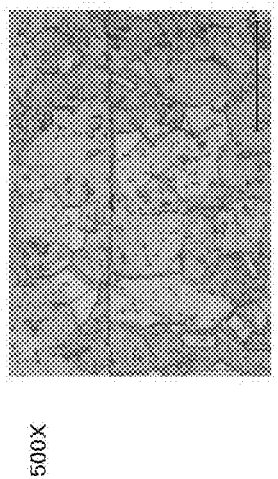
Figure 3:
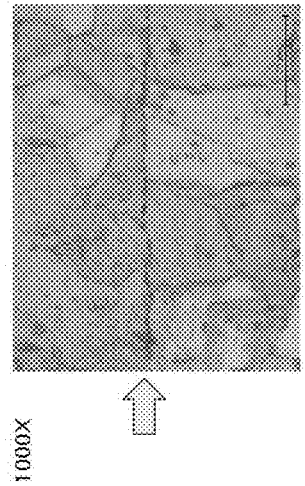
Figure 4:
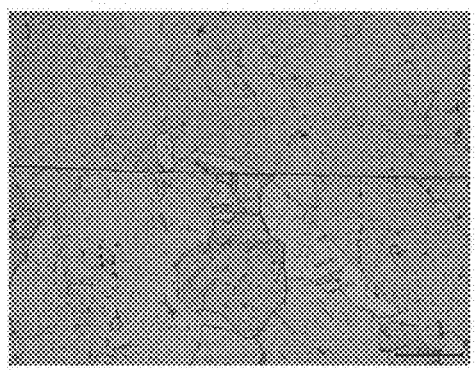
FIG. 4 shows optical microscope images taken at 200 magnifications, 500 magnifications, and 1000 magnifications, obtained by observing each section including a bonding part of copper alloy bonded bodies of Examples 47 and 53 prepared through solution annealing and an aging treatment.
Figure 4:
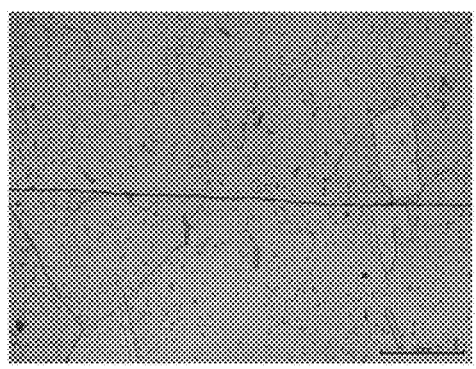
Figure 4:
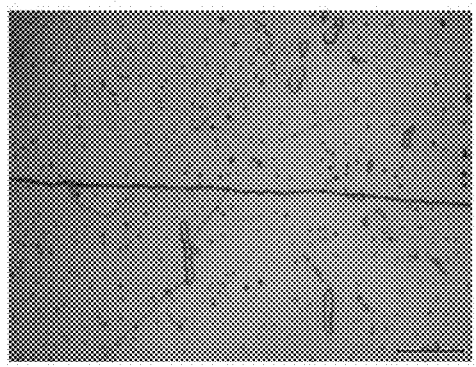
Figure 4:
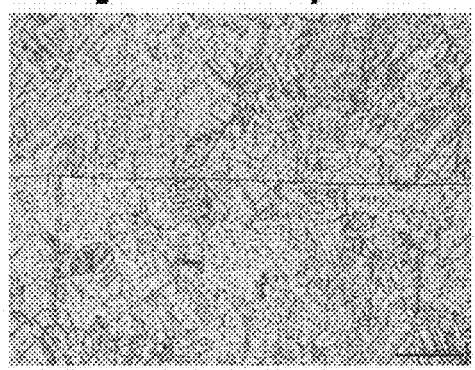
Figure 4:
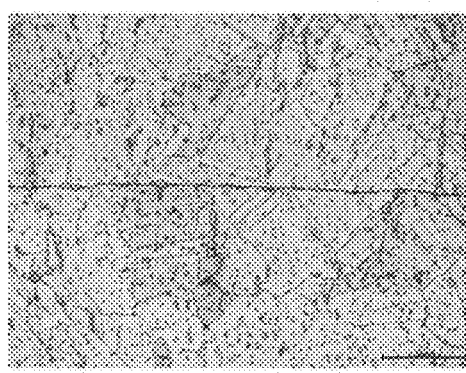
Figure 4:
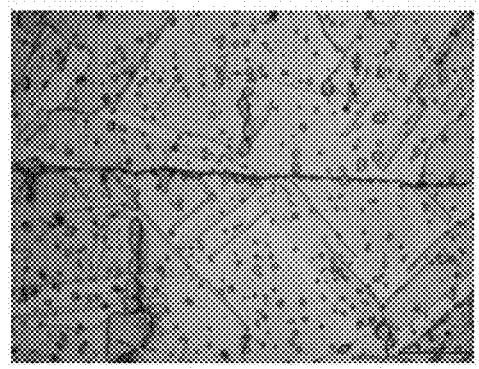
Figure 5:
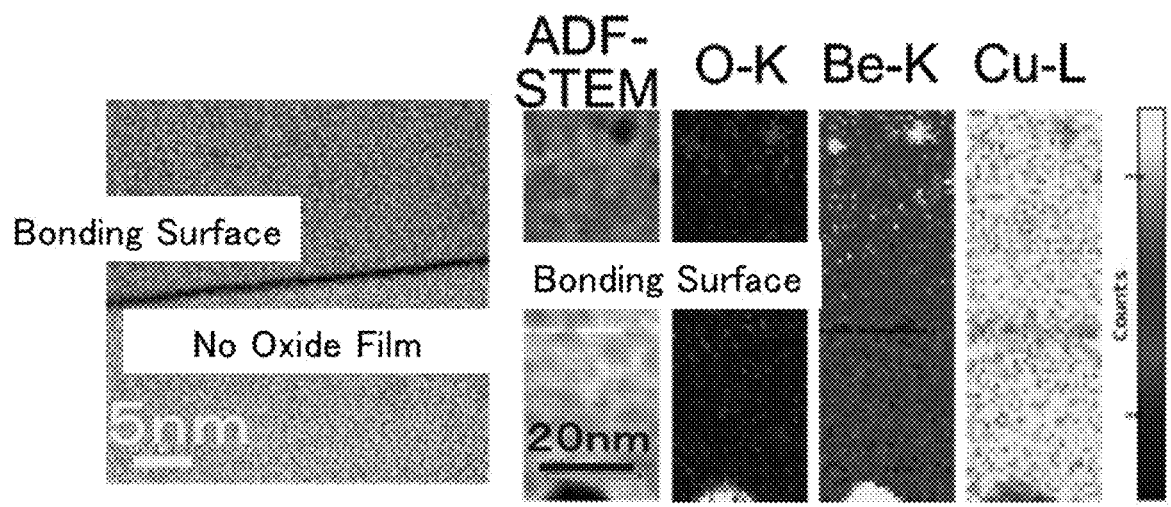
FIG. 5 shows STEM images and EELS/EDX element mapping images of a section including a bonding surface of a copper alloy bonded body (CuBe11) of Example 2 as diffusion-bonded (not through solution annealing and an aging treatment).

For the bonded body samples which were as bonded or on which the solution annealing and the aging treatment had further been performed after bonding, a section including the bonding part was cut out and polished. As a sample for observation, each region which was adjacent to the region cut out as a tensile test specimen as described above and had been subjected to the same thermal treatment step for bonding was utilized. The obtained section was observed with an optical microscope at 200 magnifications, 500 magnifications, and 1000 magnifications to check whether the bonding interface had disappeared or not (in other words, whether the bonding interface remained or not). The results were as shown in Tables 2B, 3B, 4B, and 5B. FIG. 2 shows photographs of sections obtained in Examples 2, 30, 33, 43, and 46, FIG. 3 shows photographs of sections obtained in Examples 26, 27, and 28, and FIG. 4 shows photographs of sections obtained in Examples 47 and 53. These figures demonstrate that the bonding interface had disappeared in Example 2 (CuBe11) and Example 30 (CuBe10Zr), which are embodiments, suggesting high bonding quality, and that, in contrast, the bonding interface remained in the bonded body samples of Example 43 (CuBe25) and Example 46 (CuBe165), which are comparative examples. However, in the bonded body samples of Example 33 (CuBe50), Example 26 (CuCr), Example 27 (CuCrZr), and Examples 28 and 47 (Corson copper AMPCO940), and Example 53 (Corson copper AMPCO944), which are embodiments, the bonding interface was confirmed to remain in spite of the fact that a high bonding strength was obtained. This shows that disappearance of the bonding interface is effective in realizing a high bonding strength, which is an object of the present invention, but is not essential. Based on the fact that a high bonding strength was obtained, it can be said that a favorable bonding state is also realized in bonded body samples of Examples 33, 26, 27, 28, 47, and 53, where the bonding interface was confirmed to remain, as well as Examples 2 and 3.

<STEM Observation and EELS/EDX Elemental Analysis of Bonding Interface>

A section including the bonding interface was cut out for the bonded body samples as diffusion-bonded and/or bonded body samples subjected to the solution annealing and the aging treatment (hereinafter, referred to solution aging) of Examples 2, 3, 26, 30, 33, 43, 46, 47, and 53, and processed into the form of a thin piece with a focused ion beam (FIB, product name: NB5000, manufactured by Hitachi High-Technologies Corporation). The obtained section including the bonding interface of each bonded body sample was observed with a scanning transmission electron microscope (STEM, product name: HD-2700, manufactured by Hitachi High-Technologies Corporation) including a spherical aberration correction function under a measurement condition of an acceleration voltage of 200 kV to check the presence or absence of an oxide film at the bonding interface or measure the thickness of the oxide film. Further, the elemental analysis of the bonding surface and the vicinity of the bonding surface was performed with an electron energy loss spectrometer (EELS, trade name: Enfinium, manufactured by Gatan, Inc.)/an energy dispersive X-ray analyzer (EDX, trade name; XMAXN 100TLE, manufactured by Oxford Instruments plc), which were attached to STEM. Those results were shown in Tables 2B, 3B, 4B, and 5B, and FIGS. 5 to 8, and as described below.

Examples 2 and 3 are examples in which a bonded body having a high bonding strength (>690 MPa) was realized as a result of using CuBe11 and allowing the bonded body to withstand the solution aging. In these bonded body samples of Examples 2 and 3, the presence of the bonding surface was not confirmed by optical microscope observation, but STEM observation shows that a part which was able to be specified as the bonding surface was present. However, as can be seen from the STEM images and EELS/EDX element mapping images shown in FIG. 5, an observation result shows that an oxide film did not remain at the bonding surface in Example 2 (that is, the thickness of the oxide film was 0 nm). An oxide film was not confirmed to remain from EELS mapping either. On the other hand, in the bonded body (as bonded) of Example 3, an oxide film having a thickness of 0.7 nm was observed in a part. EELS mapping also confirmed that an oxide film having a thickness of 1 nm or less remained. As described above, an oxide film having a thickness of 0 to 1 nm was present in CuBe11, but it is understood that an oxide film approximately as thin as this makes it possible to secure a favorable bonding strength.

Example 30 is an example in which a bonded body having a high bonding strength (>690 MPa) was realized as a result of using CuBe10Zr and allowing the bonded body to withstand the solution aging. STEM observation and EELS/EDX elemental analysis show that an oxide film did not remain, which was the same as in Example 2 (CuBe11). The presence of a part where Zr was concentrated was confirmed in the base material matrix but does not affect the bonding quality because an oxide (ZrO) did not remain at the bonding interface.

Example 33 is an example in which a bonded body having a high bonding strength (>690 MPa) was realized as a result of using CuBe50 and allowing the bonded body to withstand the solution aging. STEM observation and EELS/EDX elemental analysis show that an oxide film did not remain, which was the same as in Example 2 (CuBe11) and Example 19 (CuBe10Zr). These results agree with the mechanically characteristic behavior that the bonded bodies withstand the solution aging.

Example 26 is an example in which a bonded body having a high bonding strength was realized as a result of using CuCr and allowing the bonded body to withstand the solution aging. STEM observation and EELS/EDX elemental analysis show that an oxide film did not remain, which was the same as in Example 2 (CuBe11), Example 30 (CuBe10Zr), and Example 33 (CuBe50). The presence of a part where Cr was concentrated was confirmed in the base material matrix and at the bonding interface but does not affect the bonding quality because an oxide (CrO) did not remain at the bonding interface. These results agree with the mechanically characteristic behavior that the bonded bodies withstand the solution aging.

Figure 6A:
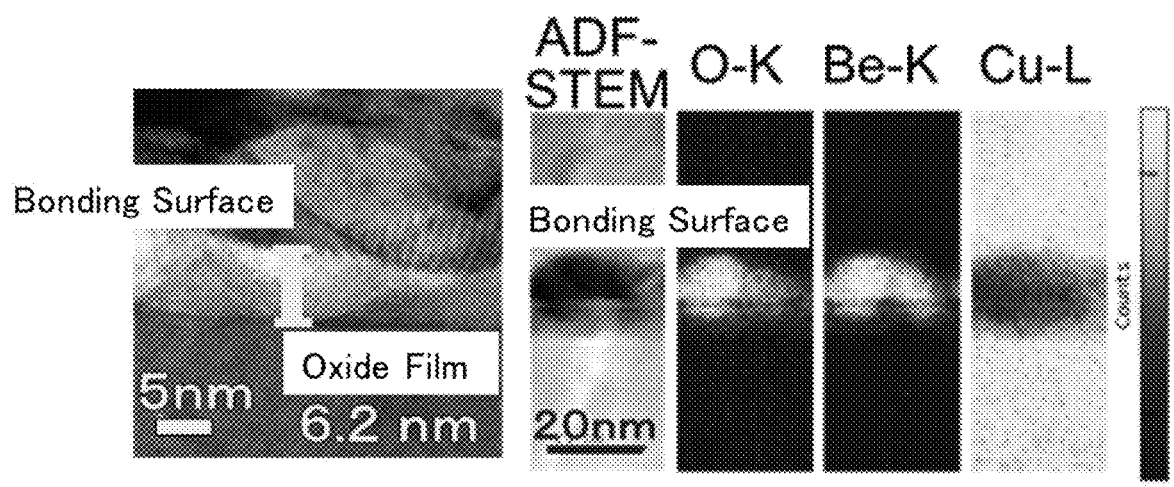
FIG. 6A shows STEM images and EELS/EDX element mapping images of a section including a bonding surface of a copper alloy bonded body (CuBe25) of Example 43 (comparison) as diffusion-bonded (not through solution annealing and an aging treatment).
Figure 6B:
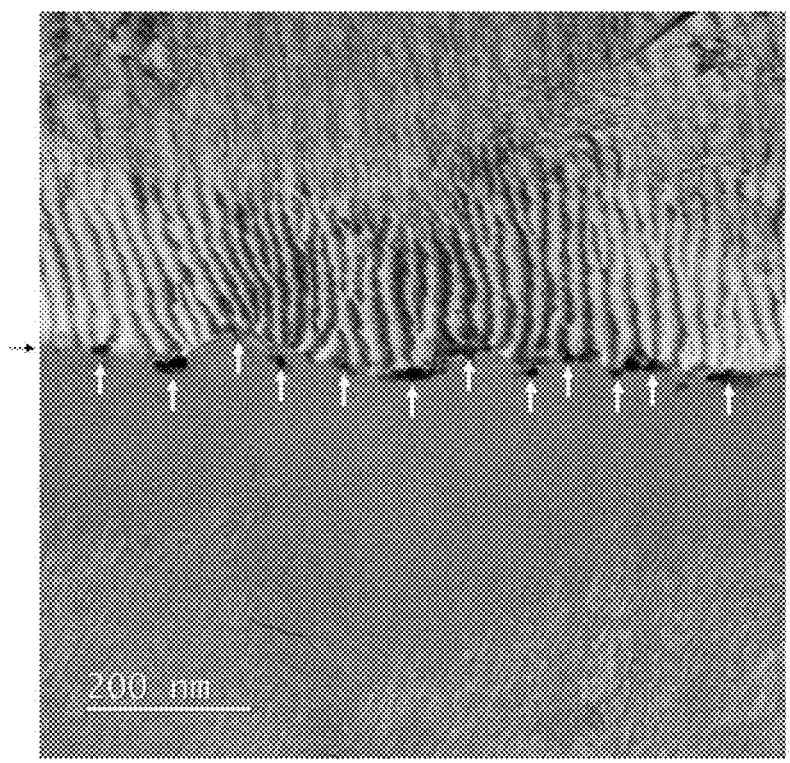
FIG. 6B is a STEM image (HAADF image) of the section including the bonding surface of the copper alloy bonded body (CuBe25) shown in FIG. 6A.
Figure 6C:
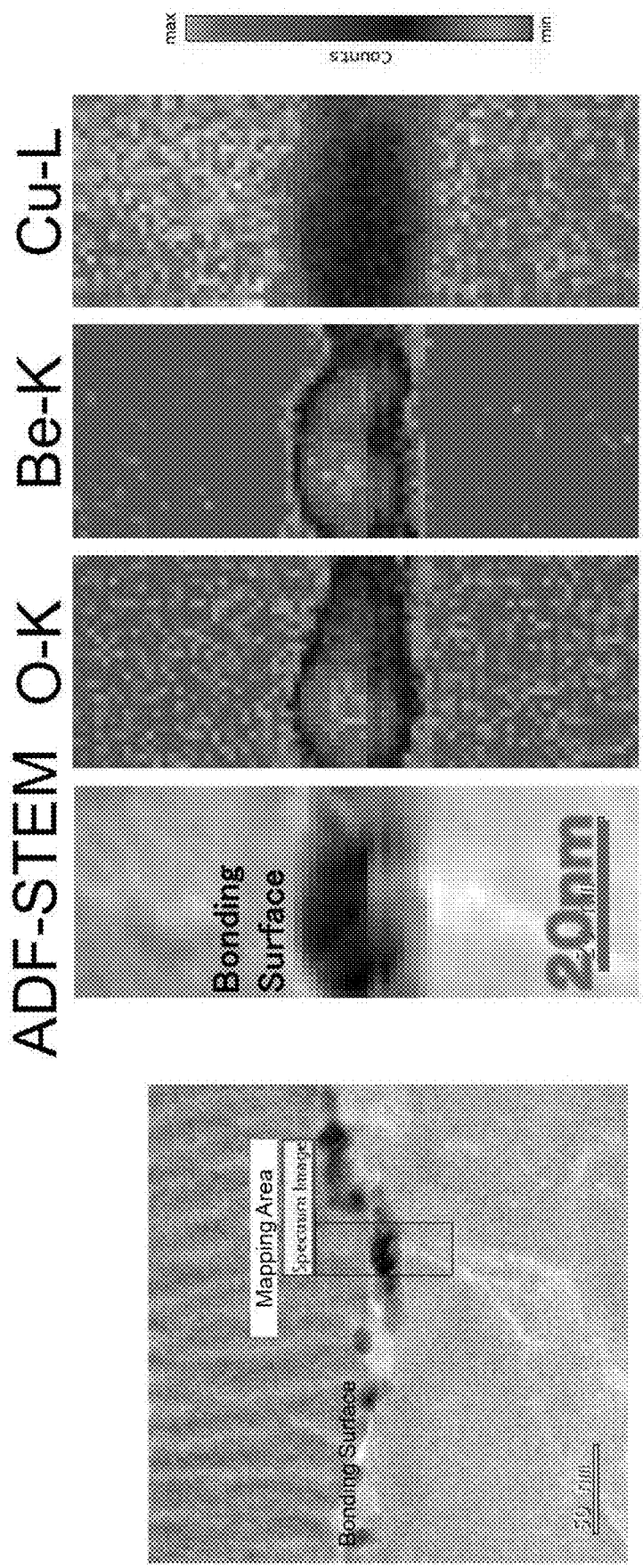
FIG. 6C shows STEM images and EELS/EDX element mapping images of the section including the bonding surface of the copper alloy bonded body (CuBe25) shown in FIG. 6A.
Figure 7:
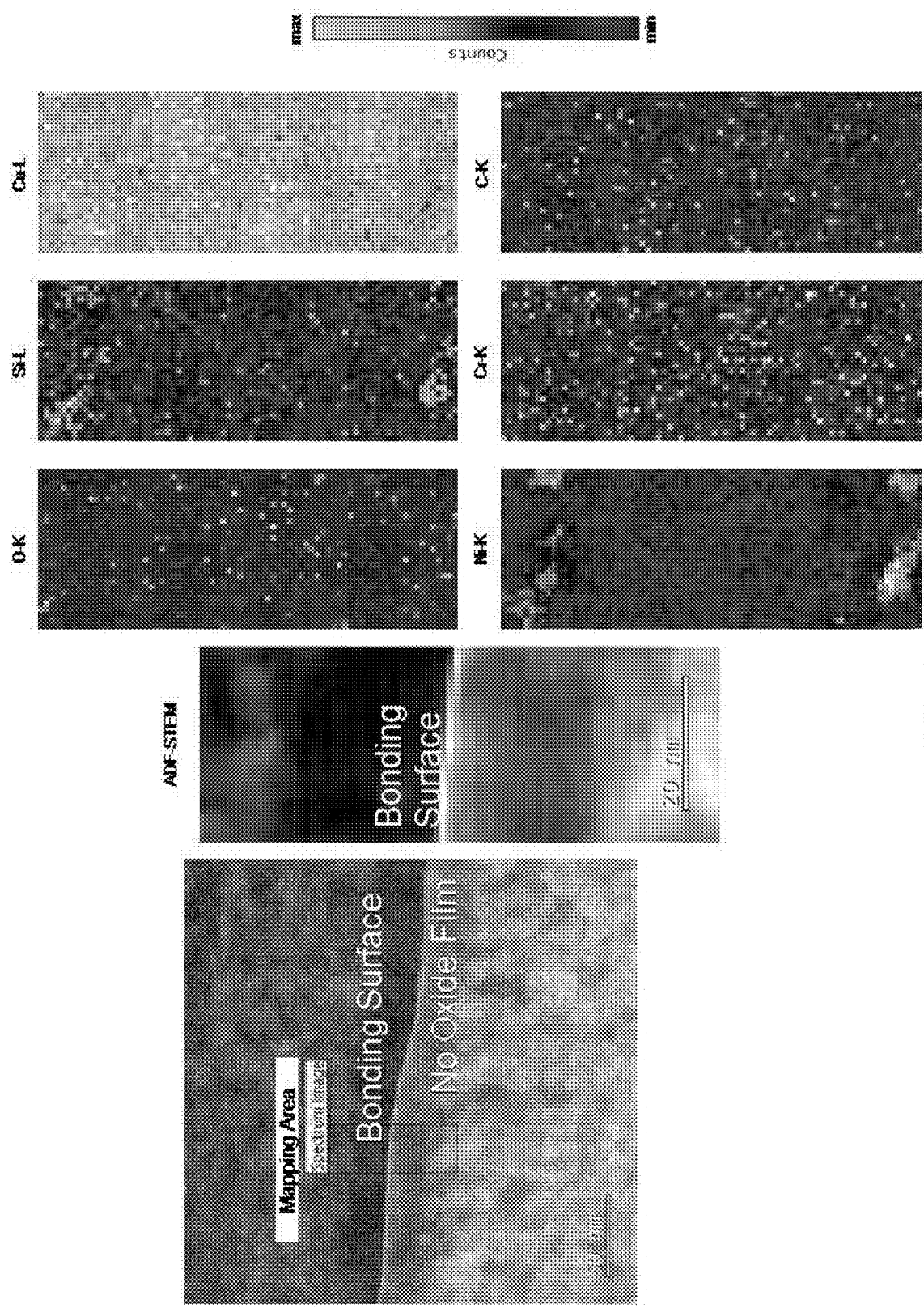
FIG. 7 shows STEM images and EELS/EDX element mapping images of a section including a bonding surface of a copper alloy bonded body (Corson copper AMPCO940) of Example 47 on which solution annealing and an aging treatment was performed after diffusion bonding.
Figure 8:
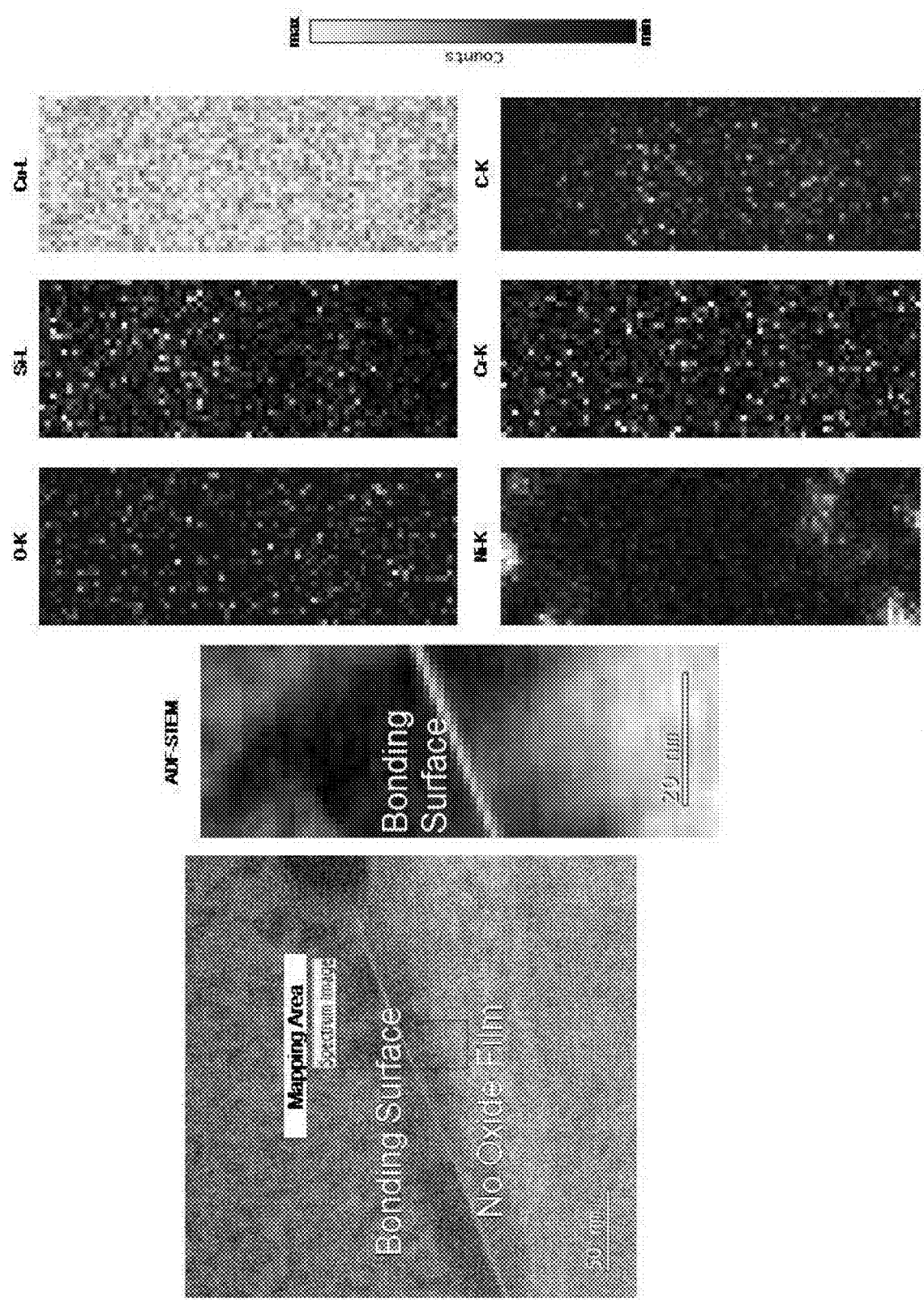
FIG. 8 shows STEM images and EELS/EDX element mapping images of a section including a bonding surface of a copper alloy bonded body (Corson copper AMPCO944) of Example 53 on which solution annealing and an aging treatment was performed after diffusion bonding.

Example 43 (Comparison) is a comparative example regarding a bonded body broken during the solution aging as a result of using CuBe25. STEM observation and EELS/EDX elemental analysis show that a homogeneous oxide film having a thickness of about 6 nm was present over the whole bonding interface in the bonded body (as bonded). The oxide film had a thickness of 5.8 nm and 6.2 nm at particular two positions (see FIG. 6A). In addition, as shown in FIG. 6B, in which a region where the concentration of BeO is high is shown by black points (stressed by arrows), an observation result shows that thick sphere-like oxide films were present in places. In FIG. 6B, the thicknesses of the oxide films in these spherical parts were decided as about 15 to about 20 nm from EELS mapping shown in FIG. 6C.

Example 46 (Comparison) is a comparative example regarding a bonded body broken during the solution aging as a result of using CuBe165. STEM observation and EELS/EDX elemental analysis show that a homogeneous oxide film over the whole bonding surface was not present and a region where an oxide film is absent was present locally. However, an observation result shows that thick sphere-like oxide films caused by high-concentration BeO were present in places. The thicknesses of these sphere-like oxide films were decided as about 20 nm to about 50 nm or more. The thickness of the oxide film including both of the homogeneous oxide films and the sphere-like oxide films was decided as within a range of 1 to 80 nm.

Examples 47 and 53 are examples in which a bonded body having a high bonding strength was realized as a result of using Corson copper AMPCO940 and Corson copper AMPCO944 respectively so that the bonded body could withstand the solution aging. In these bonded bodies of Examples 47 and 53, STEM observation shows that a part which was able to be specified as the bonding surface was present. However, as can be seen from the STEM images and EELS/EDX element mapping images shown in FIGS. 7 and 8 (corresponding to Examples 47 and 53 respectively), observation results show that an oxide film did not remain at the bonding surface (that is, the thickness of the oxide film was 0 nm) in Examples 47 and 53. An oxide film was not confirmed to remain from EELS mapping either.

<Measurement of Electrical Conductivity and Conversion to Thermal Conductivity>

The electrical conductivity (IACS %) of each bonded body sample was measure at room temperature using an eddy current electrical conductivity meter (product name: Hocking AutoSigma 3000DL, manufactured by GE Sensing & Inspection Technologies). The obtained electrical conductivity was converted with a correlation equation based on the Wiedemann-Franz law to determine the thermal conductivity (W/mK).

<Studies on Homogenization Treatment Temperature>

On the intermediate bonded bodies (before being subjected to the solution annealing) of Examples 1 to 3, 8 to 11, 16 to 25, 30, 32 to 35, 47, 48, 53, and 55 to 57, subjected to the hot pressing, homogenization treatments (high-temperature soaking) at different temperatures of 900° C., 930° C., 960° C., or 980° C. were performed for 8 hours, and the intermediate bonded bodies were cooled in a furnace and then held at 930° C. for 5 minutes and cooled with water (solution annealing). The resultant bonded bodies were held at 450° C. for 3 hours (in Examples 1 to 3, 8 to 11, 16 to 25, 30, 32 to 35, and 55 to 57) or at 500° C. for 2 hours (in Examples 47, 48, and 53) and then cooled in a furnace (aging treatment). Each bonded body sample was processed to prepare a specimen in accordance with ASTM E8M Specimen 3 in such a way that the bonding part was at the central position of the specimen. A tensile test was performed on this specimen following the procedures in accordance with ASTM E8M to measure the tensile strength (bonding strength), and then the breaking position was checked. The results were as shown in Tables 2C, 30, 4C, and 5C. As is clear from the results shown in these tables, when the homogenization treatment temperature is higher, the bonding interface is more likely to disappear, and fracture of the base material, not at the bonding surface, is more likely to occur in the tensile test (however, even when the homogenization treatment was not performed, fracture of the base material occurred in some bonded body samples, therefore the homogenization treatment is not essential in crystal grain growth beyond the bonding interface or the position where the bonding interface was present, but by the homogenization treatment, the bonding surface disappeared more completely and the fracture of the base material occurred in all the bonded bodies.).

Table 2A

TABLE 2A

| Ex. | Copper alloy Alloy type | Copper alloy Applicable standard | Copper alloy Alloy composition (% by weight) | Surface roughness Rzjis (μm) Top side | Surface roughness Rzjis (μm) Bottom side | Surface treatment | Bonding conditions Temp. × time | Bonding conditions Pressure (MPa) | Bonding conditions Degree of vacuum (Torr) | Amount of deformation during bonding (%) |
|---|---|---|---|---|---|---|---|---|---|---|
| 1 | CuBe11 | JIS C1751 | Cu-1.91Ni-0.39Be | 0.65 | 0.57 | 30% Nitric acid | 840° C. × 1 h | 32.7 | 5 × 10⁻⁴ | 19.4 |
| 2 | CuBe11 | JIS C1751 | Cu-1.91Ni-0.39Be | 0.55 | 0.62 | 30% Nitric acid | 840° C. × 1 h | 14.9 | 5 × 10⁻⁴ | 6.1 |
| 3 | CuBe11 | JIS C1751 | Cu-1.91Ni-0.39Be | 0.58 | 0.62 | 30% Nitric acid | 840° C. × 1 h | 14.9 | 5 × 10⁻⁴ | 6.3 |
| 4 | CuBe11 | JIS C1751 | Cu-1.91Ni-0.39Be | 0.50 | 0.54 | 30% Nitric acid | 840° C. × 1 h | 6.5 | 5 × 10⁻⁴ | 0.8 |
| 5 | CuBe11 | JIS C1751 | Cu-1.91Ni-0.39Be | 0.64 | 0.65 | 30% Nitric acid | 900° C. × 1 h | 32.7 | 5 × 10⁻⁴ | 24.1 |
| 6 | CuBe11 | JIS C1751 | Cu-1.91Ni-0.39Be | 0.66 | 0.52 | 30% Nitric acid | 900° C. × 1 h | 23.2 | 5 × 10⁻⁴ | 20.0 |
| 7 | CuBe11 | JIS C1751 | Cu-1.91Ni-0.39Be | 0.52 | 0.41 | 30% Nitric acid | 900° C. × 1 h | 14.9 | 5 × 10⁻⁴ | 18.7 |
| 8 | CuBe11 | JIS C1751 | Cu-1.91Ni-0.39Be | 0.47 | 0.69 | 30% Nitric acid | 900° C. × 1 h | 11.2 | 5 × 10⁻⁴ | 18.7 |
| 9 | CuBe11 | JIS C1751 | Cu-1.91Ni-0.39Be | 0.62 | 0.75 | 30% Nitric acid | 900° C. × 1 h | 6.5 | 5 × 10⁻⁴ | 5.4 |
| 10 | CuBe11 | JIS C1751 | Cu-1.91Ni-0.39Be | 0.54 | 0.69 | 30% Nitric acid | 900° C. × 1 h | 11.2 | 1 × 10⁻³ | 9.6 |
| 11 | CuBe11 | JIS C1751 | Cu-1.91Ni-0.39Be | 0.58 | 0.77 | 30% Nitric acid | 900° C. × 1 h | 11.2 | 1 × 10⁻² | 7.8 |
| 12 | CuBe11 | JIS C1751 | Cu-1.91Ni-0.39Be | 0.76 | 0.66 | 30% Nitric acid | 780° C. × 1 h | 16.0 | 5 × 10⁻⁴ | 1.0 |
| 13 | CuBe11 | JIS C1751 | Cu-1.91Ni-0.39Be | 0.49 | 0.52 | 30% Nitric acid | 720° C. × 1 h | 16.0 | 5 × 10⁻⁴ | 0.8 |
| 14 | CuBe11 | JIS C1751 | Cu-1.91Ni-0.39Be | 0.59 | 0.70 | 30% Nitric acid | 720° C. × 1 h | 25.0 | 5 × 10⁻⁴ | 2.0 |
| 15 | CuBe11 | JIS C1751 | Cu-1.91Ni-0.39Be | 0.66 | 0.81 | 30% Nitric acid | 660° C. × 1 h | 25.0 | 5 × 10⁻⁴ | 1.2 |
| 16 | CuBe11 | JIS C1751 | Cu-1.91Ni-0.39Be | 2.11 | 2.45 | 30% Nitric acid | 840° C. × 1 h | 6.5 | 5 × 10⁻⁴ | 1.5 |
| 17 | CuBe11 | JIS C1751 | Cu-1.91Ni-0.39Be | 2.90 | 2.62 | 30% Nitric acid | 840° C. × 1 h | 14.9 | 5 × 10⁻⁴ | 6.8 |
| 18 | CuBe11 | JIS C1751 | Cu-1.91Ni-0.39Be | 2.20 | 2.39 | 30% Nitric acid | 640° C. × 1 h | 25.0 | 5 × 10⁻⁴ | 1.8 |

Table 2B

TABLE 2B

| | | After bonding (as bonded) | | | | After solution annealing (same as right column) (not aging-treated) | |
|---|---|---|---|---|---|---|---|
| Ex. | Copper alloy Alloy type | Bonding interface remains or not | Thickness (nm) of oxide film at bonding part | Bonding strength (MPa) | Breaking position | Bonding strength (MPa) | Breaking position |
| 1 | CuBe11 | Not | — | 305 | Base material | 286 | Base material |
| 2 | CuBe11 | Not | 0 | 293 | Base material | 295 | Base material |
| 3 | CuBe11 | Not | 0~1.0 | 295 | Base material | 297 | Base material |
| 4 | CuBe11 | Remains | — | 299 | Base material | 257 | Base material |
| 5 | CuBe11 | Not | — | 299 | Base material | 287 | Base material |
| 6 | CuBe11 | Not | — | 293 | Base material | 291 | Base material |
| 7 | CuBe11 | Not | — | 298 | Base material | 295 | Base material |
| 8 | CuBe11 | Not | — | 297 | Base material | 297 | Base material |
| 9 | CuBe11 | Remains | — | 301 | Base material | 296 | Base material |
| 10 | CuBe11 | Remains | — | 298 | Base material | 288 | Base material |
| 11 | CuBe11 | Remains | — | 298 | Base material | 298 | Base material |
| 12 | CuBe11 | Remains | — | 327 | Base material | — | — |
| 13 | CuBe11 | Remains | — | 240 | Base material | — | — |
| 14 | CuBe11 | Remains | — | 260 | Base material | — | — |
| 15 | CuBe11 | Remains | — | 271 | Base material | — | — |
| 16 | CuBe11 | Remains | — | 290 | Base material | 255 | Base material |
| 17 | CuBe11 | Not | — | 288 | Base material | 276 | Base material |
| 18 | CuBe11 | Remains | — | 293 | Base material | 288 | Base material |

After solution annealing (930° C. × 5 min → cooling with water) and aging treatment (450° C. × 3 h → cooling in furnace)

| Ex. | Bonding interface remains or not | Thickness (nm) of oxide film at bonding part | Bonding strength (MPa) | Breaking position | Electrical conductivity (IACS %) | Thermal conductivity (W/mK) |
|---|---|---|---|---|---|---|
| 1 | Not | 0 | 692 | Bonding part | 56.7 | 234 |
| 2 | Not | 0 | 787 | Bonding part | 56.2 | 232 |
| 3 | Not | — | 792 | Bonding part | 56.2 | 232 |
| 4 | Remains | — | 720 | Bonding part | 55.9 | 231 |
| 5 | Not | — | 709 | Base material | 55.7 | 230 |
| 6 | Not | — | 731 | Base material | 56.2 | 232 |
| 7 | Not | — | 770 | Bonding part | 55.7 | 230 |
| 8 | Not | — | 786 | Bonding part | 56.7 | 234 |
| 9 | Remains | 0 | 792 | Base material | 55.2 | 229 |
| 10 | Remains | 0 | 743 | Bonding part | 56.6 | 234 |
| 11 | Remains | 0.5 | 750 | Bonding part | 56.2 | 232 |
| 12 | Remains | — | 514 | Bonding part | 55.8 | 231 |
| 13 | Remains | — | 418 | Bonding part | 55.4 | 230 |
| 14 | Remains | 0.6 | 697 | Bonding part | 56.2 | 232 |
| 15 | Remains | — | 705 | Bonding part | 55.7 | 230 |
| 16 | Remains | — | 717 | Bonding part | 56.7 | 234 |
| 17 | Not | — | 770 | Bonding part | 56.6 | 234 |
| 18 | Remains | — | 756 | Bonding part | 56.2 | 232 |

Table 2C

TABLE 2C

Bonded body subjected to solution annealing (930° C. × 5 min → cooling with water)
and aging treatment (450° C. × 3 h → cooling in furnace)
after homogenization treatment (temperature below × 8 h → cooling in furnace)

| | | 900° C. | | | | 930° C. | | |
|---|---|---|---|---|---|---|---|---|
| Ex. | Copper alloy Alloy type | Bonding interface remains or not | Bonding strength (MPa) | Breaking position | Electrical conductivity (IACS %) | Bonding interface remains or not | Bonding strength (MPa) | Breaking position |
| 1 | CuBe11 | Not | | | 56.3 | | | |
| 2 | CuBe11 | Not | 692 | Bonding part | 56.7 | | | |
| 3 | CuBe11 | Not | | | | | | |
| 4 | CuBe11 | — | — | — | — | — | — | — |
| 5 | CuBe11 | — | — | — | — | — | — | — |
| 6 | CuBe11 | — | — | — | — | — | — | — |
| 7 | CuBe11 | — | — | — | — | — | — | — |
| 8 | CuBe11 | Remains | 698 | Bonding part | 57.0 | Not | 748 | Base material |
| 9 | CuBe11 | Remains | 733 | Base material | 56.9 | Not | 783 | Base material |
| 10 | CuBe11 | Remains | 814 | Bonding part | 55.4 | Not | 794 | Base material |
| 11 | CuBe11 | | 792 | Bonding part | 55.9 | Not | 806 | Base material |
| 12 | CuBe11 | — | — | — | — | — | — | — |
| 13 | CuBe11 | — | — | — | — | — | — | — |
| 14 | CuBe11 | — | — | — | — | — | — | — |
| 15 | CuBe11 | — | — | — | — | — | — | — |
| 16 | CuBe11 | Remains | 751 | Bonding part | 56.2 | Remains | 748 | Bonding part |
| 17 | CuBe11 | Remains | 728 | Bonding part | 56.9 | Not | 783 | Base material |
| 18 | CuBe11 | Remains | 755 | Bonding part | 56.0 | Remains | | Bonding part |

Bonded body subjected to solution annealing (930° C. × 5 min → cooling with water)
and aging treatment (450° C. × 3 h → cooling in furnace)
after homogenization treatment (temperature below × 8 h → cooling in furnace)

| | 960° C. | | | 980° C. | | | |
|---|---|---|---|---|---|---|---|
| Ex. | Bonding interface remains or not | Bonding strength (MPa) | Breaking position | Bonding interface remains or not | Bonding strength (MPa) | Breaking position | Electrical conductivity (IACS %) |
| 1 | | | | | | | 56.7 |
| 2 | Not | 735.1 | Base material | Not | 774 | Base material | 56.3 |
| 3 | | | | | | | 56.3 |
| 4 | — | — | — | — | — | — | — |
| 5 | — | — | — | — | — | — | — |
| 6 | — | — | — | — | — | — | — |
| 7 | — | — | — | — | — | — | — |
| 8 | Not | 742 | Base material | Not | 724 | Base material | 57.8 |
| 9 | Not | 767 | Base material | Not | 762 | Base material | 57.2 |
| 10 | Not | 729 | Base material | Not | 720 | Base material | 55.9 |
| 11 | Not | 786 | Base material | Not | 748 | Base material | 56.5 |
| 12 | — | — | — | Not | 737 | Base material | 55.2 |
| 13 | — | — | — | Not | 719 | Base material | 55.1 |
| 14 | — | — | — | Not | 774 | Base material | 56.9 |
| 15 | — | — | — | Not | 769 | Base material | 56.6 |
| 16 | Not | 770 | Base material | Not | 782 | Base material | 56.5 |
| 17 | Not | 769 | Base material | Not | 779 | Base material | 56.6 |
| 18 | Not | 772 | Base material | Not | 769 | Base material | 56.8 |

TABLE 3A

| Ex. | Copper alloy Alloy type | Applicable standard | Alloy composition (% by weight) | Surface roughness Rzjis (μm) Top side | Surface roughness Rzjis (μm) Bottom side | Surface treatment | Bonding conditions Temp. × time | Bonding conditions Pressure (MPa) | Degree of vacuum (Torr) | Amount of deformation during bonding (%) |
|---|---|---|---|---|---|---|---|---|---|---|
| 19 | CuBe11 | JIS C1751 | Cu-1.91Ni-0.39Be | 2.91 | 3.03 | 30% Nitric acid | 900° C. × 1 h | 6.5 | $5 \times 10^{-4}$ | 1.2 |
| 20 | CuBe11 | JIS C1751 | Cu-1.91Ni-0.39Be | 3.05 | 3.22 | 30% Nitric acid | 840° C. × 1 h | 16.0 | $5 \times 10^{-4}$ | 1.1 |
| 21 | CuBe11 | JIS C1751 | Cu-1.91Ni-0.39Be | 0.66 | 0.52 | 30% Nitric acid | 600° C. × 1 h | 25.0 | $5 \times 10^{-4}$ | 2.8 |
| 22 | CuBe11 | JIS C1751 | Cu-1.91Ni-0.39Be | 0.59 | 0.55 | 30% Nitric acid | 600° C. × 1 h | 40.0 | $5 \times 10^{-4}$ | 4.5 |
| 23 | CuBe11 | JIS C1751 | Cu-1.91Ni-0.39Be | 0.62 | 0.58 | 30% Nitric acid | 900° C. × 1 h | 6.6 | $5 \times 10^{-4}$ | 1.5 |
| 24 | CuBe11 | JIS C1751 | Cu-1.89Ni-0.42Be | 0.54 | 0.68 | 30% Nitric acid | 930° C. × 1 h | 6.6 | $5 \times 10^{-4}$ | 4.2 |
| 25 | CuBe11 | JIS C1751 | Cu-1.89Ni-0.42Be | 0.65 | 0.52 | 30% Nitric acid | 930° C. × 1 h | 8.3 | $5 \times 10^{-4}$ | 3.7 |
| 26 | CuCr | C18200 | Cu-0.9Cr | 0.75 | 0.47 | 30% Nitric acid | 870° C. × 1 h | 6.6 | $5 \times 10^{-4}$ | 8.7 |
| 27 | CuCrZr | CW106C | Cu-0.9Cr-0.08Zr | 0.69 | 0.62 | 30% Nitric acid | 840° C. × 1 h | 6.6 | $5 \times 10^{-4}$ | 10.0 |
| 28 | AMPCO940 (Corson copper) | — | Cu-2.3Ni-0.6Si-0.5Cr-0.1Sn | 0.62 | 0.54 | 30% Nitric acid | 840° C. × 1 h | 16.0 | $5 \times 10^{-4}$ | 17.3 |
| 29 | AMPCO944 (Corson copper) | — | Cu-7.1Ni-1.7Si-0.6Cr | 0.62 | 0.66 | 30% Nitric acid | 840° C. × 1 h | 12.0 | $5 \times 10^{-4}$ | 2.1 |
| 30 | CuBe10Zr | — | Cu-2.59Co-0.50Be-0.24Zr | 0.54 | 0.73 | 30% Nitric acid | 840° C. × 1 h | 14.9 | $5 \times 10^{-4}$ | 18.2 |
| 31 | CuBe14Z | — | Cu-1.40Ni-0.45Be-0.28Zr | 0.65 | 0.62 | 30% Nitric acid | 840° C. × 1 h | 16.0 | $5 \times 10^{-4}$ | 3.5 |
| 32 | CuBe14Z | — | Cu-1.40Ni-0.45Be-0.28Zr | 0.69 | 0.62 | 30% Nitric acid | 900° C. × 1 h | 12.0 | $5 \times 10^{-4}$ | 12.8 |
| 33 | CuBe50 | — | Cu-1.40Ni-0.45Be-0.1Ag-0.18Zr | 0.79 | 0.59 | 30% Nitric acid | 840° C. × 1 h | 14.9 | $5 \times 10^{-4}$ | 7.5 |
| 34 | CuCo1Ni1Be | CW103C | Cu-1.0Co-1.1Ni-0.45Be | 0.69 | 0.65 | 30% Nitric acid | 900° C. × 1 h | 6.6 | $5 \times 10^{-4}$ | 8.2 |

TABLE 3B

| Ex. | Copper alloy Alloy type | After bonding (as bonded) Bonding interface remains or not | After bonding (as bonded) Thickness (nm) of oxide film at bonding part | After bonding (as bonded) Bonding strength (MPa) | After bonding (as bonded) Breaking position | After solution annealing (same as right column) (not aging-treated) Bonding strength (MPa) | After solution annealing (same as right column) (not aging-treated) Breaking position |
|---|---|---|---|---|---|---|---|
| 19 | CuBe11 | Not | — | 298 | Base material | 269 | Base material |
| 20 | CuBe11 | Remains | — | 288 | Base material | 266 | Base material |
| 21 | CuBe11 | Not | — | 299 | Base material | 287 | Base material |
| 22 | CuBe11 | Not | — | 293 | Base material | 298 | Base material |
| 23 | CuBe11 | Not | — | 292 | Base material | 299 | Base material |
| 24 | CuBe11 | Not | — | 297 | Base material | — | — |
| 25 | CuBe11 | Not | — | 289 | Base material | — | — |
| 26 | CuCr | Remains | 0 | 244 | Base material | — | — |
| 27 | CuCrZr | Remains | — | 180 | Base material | — | — |
| 28 | AMPCO940 | Not | — | 478 | Base material | — | — |
| 29 | AMPCO944 | Remains | — | 348 | Bonding part | — | — |
| 30 | CuBe10Zr | Not | 0 | 317 | Base material | — | — |
| 31 | CuBe14Z | Remains | — | 288 | Base material | — | — |
| 32 | CuBe14Z | Remains | — | 310 | Base material | — | — |
| 33 | CuBe50 | Remains | 0 | 297 | Base material | — | — |
| 34 | CuCo1Ni1Be | Remains | — | 285 | Base material | — | — |

| Ex. | After solution annealing (930° C. × 5 min → cooling with water) and aging treatment (450° C. × 3 h → cooling in furnace) Bonding interface remains or not | Thickness (nm) of oxide film at bonding part | Bonding strength (MPa) | Breaking position | Electrical conductivity (IACS %) | Thermal conductivity (W/mK) |
|---|---|---|---|---|---|---|
| 19 | Not | — | 730 | Bonding part | 56.2 | 232 |
| 20 | Remains | — | 722 | Bonding part | 58.0 | 239 |
| 21 | Not | — | 760 | Bonding part | 56.2 | 232 |
| 22 | Not | — | 783 | Bonding part | 55.8 | 231 |
| 23 | Not | — | 808 | Bonding part | 56.2 | 232 |
| 24 | Not | — | 758 | Bonding part | 55.9 | 231 |
| 25 | Not | — | 756 | Base material | 55.6 | 230 |

TABLE 3B-continued

| | | | | | | |
|---|---|---|---|---|---|---|
| 26 | Remains | — | 382 | Base material | 80.2 | 318 |
| 27 | Remains | — | 279 | Bonding part | 83.5 | 330 |
| 28 | Not | — | 695 | Base material | 50.5 | 211 |
| 29 | Remains | 0.8 | 709 | Base material | 33.7 | 146 |
| 30 | Not | — | 775 | Bonding part | 52.3 | 218 |
| 31 | Remains | — | 564 | Bonding part | 54.5 | 226 |
| 32 | Remains | 1.2 | 695 | Bonding part | 54.2 | 225 |
| 33 | Remains | 0 | 801 | Bonding part | 58.2 | 240 |
| 34 | Remains | — | 730 | Bonding part | 53.2 | 221 |

Table 3C

TABLE 3C

Bonded body subjected to solution annealing (930° C. × 5 min → cooling with water) and aging treatment (450° C. × 3 h → cooling in furnace) after homogenization treatment (temperature below × 8 h → cooling in furnace)

| | | 900° C. | | | | 930° C. | | |
|---|---|---|---|---|---|---|---|---|
| Ex. | Copper alloy Alloy type | Bonding interface remains or not | Bonding strength (MPa) | Breaking position | Electrical conductivity (IACS %) | Bonding interface remains or not | Bonding strength (MPa) | Breaking position |
| 19 | CuBe11 | Remains | 753 | Base material | 56.8 | Not | 794 | Base material |
| 20 | CuBe11 | Remains | 712 | Bonding part | 57.9 | Not | 731 | Bonding part |
| 21 | CuBe11 | Remains | 733 | Bonding part | 57.8 | Remains | 790 | Bonding part |
| 22 | CuBe11 | Remains | 731 | Bonding part | 56.9 | Not | 749 | Bonding part |
| 23 | CuBe11 | Not | 711 | Bonding part | 58.4 | — | — | — |
| 24 | CuBe11 | Not | 711 | Bonding part | 58.1 | — | — | — |
| 25 | CuBe11 | Not | 769 | Base material | 57.7 | — | — | — |
| 26 | CuCr | — | — | — | — | — | — | — |
| 27 | CuCrZr | — | — | — | — | — | — | — |
| 28 | AMPCO940 | — | — | — | — | — | — | — |
| 29 | AMPCO944 | — | — | — | — | Not | 741 | Base material |
| 30 | CuBe10Zr | Remains | 720 | Bonding part | 52.9 | Remains | 708 | Bonding part |
| 31 | CuBe14Zr | — | — | — | — | — | — | — |
| 32 | CuBe14Zr | Remains | 739 | Bonding part | 53.9 | Not | 758 | Base material |
| 33 | CuBe50 | Remains | 778 | Bonding part | 59.8 | Remains | 770 | Bonding part |
| 34 | CuCo1Ni1Be | Remains | 730 | Bonding part | — | — | — | — |

Bonded body subjected to solution annealing (930° C. × 5 min → cooling with water) and aging treatment (450° C. × 3 h → cooling in furnace) after homogenization treatment (temperature below × 8 h → cooling in furnace)

| | 960° C. | | | 980° C. | | | |
|---|---|---|---|---|---|---|---|
| Ex. | Bonding interface remains or not | Bonding strength (MPa) | Breaking position | Bonding interface remains or not | Bonding strength (MPa) | Breaking position | Electrical conductivity (IACS %) |
| 19 | Not | 777 | Base material | Not | 799 | Base material | 57.2 |
| 20 | Not | 729 | Base material | Not | 720 | Base material | 55.9 |
| 21 | Not | 778 | Base material | Not | 772 | Base material | 56.5 |
| 22 | Not | 769 | Base material | Not | 779 | Base material | 56.6 |
| 23 | Not | 762 | Base material | Not | 734 | Base material | 58.9 |
| 24 | Not | 770 | Base material | Not | 735 | Base material | 57.8 |
| 25 | Not | 734 | Base material | Not | 740 | Base material | 57.2 |
| 26 | — | — | — | — | — | — | — |
| 27 | — | — | — | — | — | — | — |
| 28 | — | — | — | — | — | — | — |
| 29 | Not | 821 | Base material | Not | 840 | Base material | 32.7 |
| 30 | Not | 763 | Base material | Not | 724 | Base material | 51.8 |
| 31 | — | — | — | — | — | — | — |
| 32 | — | — | — | — | — | — | — |

TABLE 3C-continued

| | | | | | | | |
|---|---|---|---|---|---|---|---|
| 33 | — | — | — | Not | 754 | Base material | 58.4 |
| 34 | — | — | — | Not | 744 | Base material | 54.7 |

Table 4A

TABLE 4A

| | Copper alloy | | Surface roughness Rzjis (μm) | | | Bonding conditions | | | Amount of deformation during bonding (%) |
|---|---|---|---|---|---|---|---|---|---|
| Ex. | Alloy type | Applicable standard | Alloy composition (% by weight) | Top surface | Bottom surface | Surface treatment | Temp. × time | Pressure (MPa) | Degree of vacuum (Torr) | |
| 35* | CuBe11 | JIS C1751 | Cu-1.91Ni-0.39Be | 0.76 | 0.66 | 30% Nitric acid | 900° C. × 1 h | 14.9 | 5 × 10⁻¹ | 8.0 |
| 36* | CuBe11 | JIS C1751 | Cu-1.91Ni-0.39Be | 0.49 | 0.52 | Not performed | 900° C. × 1 h | 6.5 | 5 × 10⁻⁴ | 4.2 |
| 37* | CuBe11 | JIS C1751 | Cu-1.91Ni-0.39Be | 0.52 | 0.55 | 30% Nitric acid | 720° C. × 1 h | 16.0 | 5 × 10⁻⁴ | 0.2 |
| 38* | CuBe11 | JIS C1751 | Cu-1.91Ni-0.39Be | 0.65 | 0.58 | 30% Nitric acid | 660° C. × 1 h | 16.0 | 5 × 10⁻⁴ | 0.1 |
| 39* | CuBe11 | JIS C1751 | Cu-1.91Ni-0.39Be | 0.66 | 0.50 | 30% Nitric acid | 600° C. × 1 h | 16.0 | 5 × 10⁻⁴ | 0.1 |
| 40* | CuBe11 | JIS C1751 | Cu-1.91Ni-0.39Be | 2.63 | 2.90 | 30% Nitric acid | 660° C. × 1 h | 16.0 | 5 × 10⁻⁴ | 0.1 |
| 41* | CuBe11 | JIS C1751 | Cu-1.91Ni-0.39Be | 8.26 | 9.54 | 30% Nitric acid | 900° C. × 1 h | 6.5 | 5 × 10⁻⁴ | 5.5 |
| 42* | CuBe11 | JIS C1751 | Cu-1.91Ni-0.39Be | 0.66 | 0.65 | 30% Nitric acid | 900° C. × 1 h | 6.5 | 5 × 10⁻⁴ | 3.1 |
| 43* | CuBe25 | JIS C1720 | Cu-1.87Be-0.23Co | 0.64 | 0.52 | 30% Nitric acid | 800° C. × 1 h | 32.7 | 5 × 10⁻⁴ | 24 |
| 44* | CuBe25 | JIS C1720 | Cu-1.87Be-0.23Co | 0.66 | 0.70 | 30% Nitric acid | 800° C. × 1 h | 14.9 | 5 × 10⁻⁴ | 15 |
| 45* | CuBe25 | JIS C1720 | Cu-1.87Be-0.23Co | 0.52 | 0.81 | 30% Nitric acid | 800° C. × 1 h | 6.6 | 5 × 10⁻⁴ | 9.5 |
| 46* | CuBe165 | JIS C1700 | Cu-1.69Be-0.23Co | 0.74 | 0.60 | 30% Nitric acid | 800° C. × 1 h | 14.9 | 5 × 10⁻⁴ | 2.7 |

*shows comparative examples.

Table 4B

TABLE 4B

| | | After bonding (as bonded) | | | | After solution annealing (same as right column) (not aging-treated) | |
|---|---|---|---|---|---|---|---|
| Ex. | Copper alloy Alloy type | Bonding interface remains or not | Thickness (nm) of oxide film at bonding part | Bonding strength (MPa) | Breaking position | Bonding strength (MPa) | Breaking position |
| 35* | CuBe11 | Remains | — | 105 | Bonding part | 0# | Bonding part |
| 36* | CuBe11 | Remains | — | 45 | Bonding part | 0# | Bonding part |
| 37* | CuBe11 | — | — | 0# | Bonding part | — | — |
| 38* | CuBe11 | — | — | 0# | Bonding part | — | — |
| 39* | CuBe11 | — | — | 0# | Bonding part | — | — |
| 40* | CuBe11 | — | — | 0# | Bonding part | — | — |
| 41* | CuBe11 | — | — | 0# | Bonding part | — | — |
| 42* | CuBe11 | — | — | 0# | Bonding part | — | — |
| 43* | CuBe25 | Remains | 6~20 | 546 | Bonding part | 0# | Bonding part |
| 44* | CuBe25 | Remains | — | 520 | Bonding part | 0# | Bonding part |
| 45* | CuBe25 | Remains | — | 390 | Bonding part | 0# | Bonding part |
| 46* | CuBe165 | Remains | 1~80 | 269 | Bonding part | 0# | Bonding part |

After solution annealing (930° C. × 5 min → cooling with water) and aging treatment (450° C. × 180 min → cooling in furnace) (Examples 35 to 42), or after solution annealing (780° C. × 5 min → cooling with water) and aging treatment (320° C. × 180 min → cooling in furnace) (Examples 43 to 46)

| Ex. | Bonding interface remains or not | Thickness (nm) of oxide film at bonding part | Bonding strength (MPa) | Breaking position | Electrical conductivity (IACS %) | Thermal conductivity (W/mK) |
|---|---|---|---|---|---|---|
| 35* | Remains | — | 0# | Bonding part | — | — |
| 36* | Remains | — | 0# | Bonding part | — | — |
| 37* | — | — | — | — | — | — |
| 38* | — | — | — | — | — | — |
| 39* | — | — | — | — | — | — |
| 40* | — | — | — | — | — | — |
| 41* | — | — | — | — | — | — |

TABLE 4B-continued

| | | | | | | |
|---|---|---|---|---|---|---|
| 42* | — | — | — | — | — | — |
| 43* | Remains | — | 0# | Bonding part | 27.5 | — |
| 44* | — | — | 0# | Bonding part | — | — |
| 45* | Remains | — | 0# | Bonding part | — | — |
| 46* | Remains | — | 0# | Bonding part | 28.2 | — |

*shows comparative examples.
0# means that the bonding strength was regarded as 0 MPa because the test specimen was broken during the thermal treatment, during processing the test specimen, or during attaching the test specimen to the tensile tester.

Table 4C

TABLE 4C

| | | Bonded body subjected to solution annealing and aging treatment after homogenization treatment (temperature below × 480 min → cooling in furnace) | | | | | | |
|---|---|---|---|---|---|---|---|---|
| | | 900° C. | | | | 930° C. | | |
| Ex. | Copper alloy Alloy type | Bonding interface remains or not | Bonding strength (MPa) | Breaking position | Electrical conductivity* (IACS %) | Bonding interface remains or not | Bonding strength (MPa) | Breaking position |
| 35* | CuBe11 | Remains | 264 | Bonding part | 56.0 | Remains | 226 | Bonding part |
| 36* | CuBe11 | — | — | — | — | — | — | — |
| 37* | CuBe11 | — | — | — | — | — | — | — |
| 38* | CuBe11 | — | — | — | — | — | — | — |
| 39* | CuBe11 | — | — | — | — | — | — | — |
| 40* | CuBe11 | — | — | — | — | — | — | — |
| 41* | CuBe11 | — | — | — | — | — | — | — |
| 42* | CuBe11 | — | — | — | — | — | — | — |
| 43* | CuBe25 | — | — | — | — | — | — | — |
| 44* | CuBe25 | — | — | — | — | — | — | — |
| 45* | CuBe25 | — | — | — | — | — | — | — |
| 46* | CuBe165 | — | — | — | — | — | — | — |

| | Bonded body subjected to solution annealing and aging treatment after homogenization treatment (temperature below × 480 min → cooling in furnace) | | | | | |
|---|---|---|---|---|---|---|
| | 960° C. | | | 980° C. | | |
| | Bonding interface remains or not | Bonding strength (MPa) | Breaking position | Bonding interface remains or not | Bonding strength (MPa) | Breaking position | Electrical conductivity* (IACS %) |
| Ex. 35* | Remains | 666 | Bonding part | Remains | 194 | Bonding part | — |
| 36* | — | — | — | — | — | — | — |
| 37* | — | — | — | — | — | — | — |
| 38* | — | — | — | — | — | — | — |
| 39* | — | — | — | — | — | — | — |
| 40* | — | — | — | — | — | — | — |
| 41* | — | — | — | — | — | — | — |
| 42* | — | — | — | — | — | — | — |
| 43* | — | — | — | — | — | — | — |
| 44* | — | — | — | — | — | — | — |
| 45* | — | — | — | — | — | — | — |

*shows comparative examples.

TABLE 5A

| Ex. | Copper alloy Alloy type | Applicable standard | Alloy composition (% by weight) | Surface roughness Rzjis (μm) Top side | Bottom side |
|---|---|---|---|---|---|
| 47 | AMPCO940 (Corson copper) | — | Cu-2.3Ni-0.6Si-0.5Cr-0.1Sn | 2.440 | 1.859 |
| 48 | AMPCO940 (Corson copper) | — | Cu-2.3Ni-0.6Si-0.5Cr-0.1Sn | 2.568 | 2.012 |
| 49 | AMPCO940 (Corson copper) | — | Cu-2.3Ni-0.6Si-0.5Cr-0.1Sn | 2.687 | 2.345 |
| 50 | AMPCO940 (Corson copper) | — | Cu-2.3Ni-0.6Si-0.5Cr-0.1Sn | 1.752 | 2.056 |
| 51 | AMPCO940 (Corson copper) | — | Cu-2.3Ni-0.6Si-0.5Cr-0.1Sn | 1.982 | 2.361 |
| 52 | AMPCO940 (Corson copper) | — | Cu-2.3Ni-0.6Si-0.5Cr-0.1Sn | 2.498 | 1.709 |
| 53 | AMPCO944 (Corson copper) | — | Cu-7.1Ni-1.7Si-0.6Cr | 3.245 | 3.655 |
| 54 | AMPCO944 (Corson copper) | — | Cu-7.1Ni-1.7Si-0.6Cr | 1.565 | 1.782 |
| 55 | CuBe11 | JISC1751 | Cu-1.91Ni-0.39Be | 0.267 | 0.215 |
| 56 | CuBe11 | JISC1751 | Cu-1.91Ni-0.39Be | 1.82 | 1.64 |
| 57 | CuBe11 | JISC1751 | Cu-1.91Ni-0.39Be | 2.45 | 3.25 |

| Ex. | Surface treatment | Bonding conditions Temp. × time | Pressure (MPa) | Degree of vacuum (Torr) | Amount of deformation during bonding (%) |
|---|---|---|---|---|---|
| 47 | 30% Nitric acid | 900° C. × 1 h | 12 | $5 \times 10^{-4}$ | 16.1 |
| 48 | 30% Nitric acid | 900° C. × 1 h | 16 | $1 \times 10^{-1}$ | 24.6 |
| 49 | Emery paper #600 | 900° C. × 1 h | 16 | $5 \times 10^{-4}$ | 21.5 |
| 50 | 30% Nitric acid | 780° C. × 1 h | 9 | $5 \times 10^{-4}$ | 5.9 |
| 51 | 30% Nitric acid | 840° C. × 1 h | 16 | $5 \times 10^{-4}$ | 13.6 |
| 52 | 30% Nitric acid | 840° C. × 1 h | 16 | $1 \times 10^{-1}$ | 15.1 |
| 53 | 30% Nitric acid | 900° C. × 1 h | 16 | $5 \times 10^{-4}$ | 9.5 |
| 54 | Emery paper #600 | 900° C. × 1 h | 16 | $5 \times 10^{-4}$ | 10.0 |
| 55 | 20% Sulfuric acid containing 3% of $H_2O_2$ | 900° C. × 1 h | 16 | $5 \times 10^{-4}$ | 8.5 |
| 56 | Emery paper #600 | 900° C. × 1 h | 16 | $5 \times 10^{-4}$ | 6.4 |
| 57 | Buff #320 | 900° C. × 1 h | 16 | $5 \times 10^{-4}$ | 9.1 |

TABLE 5B

| | | After bonding (as bonded) | | | | After solution annealing (same as right column) (not aging-treated) | |
|---|---|---|---|---|---|---|---|
| Ex. | Copper alloy Alloy type | Bonding interface remains or not | Thickness (nm) of oxide film at bonding part | Bonding strength (MPa) | Breaking position | Bonding strength (MPa) | Breaking position |
| 47 | AMPCO940 (Corson copper) | Remains | — | 438 | Base material | — | — |
| 48 | AMPCO940 (Corson copper) | Remains | — | 473 | Base material | — | — |
| 49 | AMPCO940 (Corson copper) | Remains | — | 474 | Base material | — | — |
| 50 | AMPCO940 (Corson copper) | Remains | — | 436 | Bonding part | — | — |
| 51 | AMPCO940 (Corson copper) | Remains | — | 326 | Bonding part | — | — |

TABLE 5B-continued

| Ex. | | Bonding interface remains or not | Thickness (nm) of oxide film at bonding part | Bonding strength (MPa) | Breaking position | Electrical conductivity (IACS %) | Thermal conductivity (W/mK) |
|---|---|---|---|---|---|---|---|
| 52 | AMPCO940 (Corson copper) | Remains | — | 321 | Bonding part | — | — |
| 53 | AMPCO944 (Corson copper) | Remains | — | 503 | Bonding part | — | — |
| 54 | AMPCO944 (Corson copper) | Remains | — | 497 | Bonding part | — | — |
| 55 | CuBe11 | Not | — | 315 | Base material | — | — |
| 56 | CuBe11 | Not | — | 289 | Base material | — | — |
| 57 | CuBe11 | Not | — | 295 | Base material | — | — |

After solution annealing (930° C. × 5 min → cooling with water) and aging treatment (500° C. × 2 h → cooling in furnace) (Examples 47 to 54), or after solution annealing (930° C. × 5 min → cooling with water) and aging treatment (450° C. × 3 h → cooling in furnace) (Examples 55 to 57)

| Ex. | Bonding interface remains or not | Thickness (nm) of oxide film at bonding part | Bonding strength (MPa) | Breaking position | Electrical conductivity (IACS %) | Thermal conductivity (W/mK) |
|---|---|---|---|---|---|---|
| 47 | Remains | 0 | 657 | Base material | 41.6 | 177 |
| 48 | Remains | 0 | 597 | Bonding part | 42.7 | 181 |
| 49 | Remains | — | 638 | Base material | 42.3 | 180 |
| 50 | Remains | — | 609 | Bonding part | 41.9 | 178 |
| 51 | Remains | — | 593 | Bonding part | 42 | 179 |
| 52 | Remains | — | 632 | Bonding part | 41.4 | 176 |
| 53 | Remains | 0 | 807 | Bonding part | 31 | 136 |
| 54 | Remains | — | 863 | Bonding part | 29.8 | 131 |
| 55 | Remains | 0.5 | 717 | Bonding part | 56.6 | 234 |
| 56 | Remains | — | 698 | Bonding part | 55.7 | 230 |
| 57 | Remains | — | 702 | Bonding part | 55.2 | 229 |

Table 5C

TABLE 5C

Bonded body (Examples 47 to 54) subjected to solution annealing (930° C. × 5 min → cooling with water) and aging treatment (500° C. × 2 h → cooling in furnace) after homogenization annealing (temperature below × 8 h → cooling in furnace), or bonded body (Examples 55 to 57) subjected to solution annealing (930° C. × 5 min → cooling with water) and aging treatment (450° C. × 3 h → cooling in furnace) after homogenization annealing (temperature below × 8 h → cooling in furnace)

| Ex. | Copper alloy Alloy type | 900° C. Bonding interface remains or not | Bonding strength (MPa) | Breaking position | Electrical conductivity (IACS %) | 930° C. Bonding interface remains or not | Bonding strength (MPa) | Breaking position |
|---|---|---|---|---|---|---|---|---|
| 47 | AMPCO940 (Corson copper) | — | — | — | — | — | — | — |
| 48 | AMPCO940 (Corson copper) | — | — | — | — | — | — | — |
| 49 | AMPCO940 (Corson copper) | — | — | — | — | — | — | — |
| 50 | AMPCO940 (Corson copper) | — | — | — | — | — | — | — |
| 51 | AMPCO940 (Corson copper) | — | — | — | — | — | — | — |
| 52 | AMPCO940 (Corson copper) | — | — | — | — | — | — | — |
| 53 | AMPCO944 (Corson copper) | — | — | — | — | — | — | — |
| 54 | AMPCO944 (Corson copper) | — | — | — | — | — | — | — |

TABLE 5C-continued

| Ex. | Alloy |  |  |  |  | Bonding interface remains or not | Bonding strength (MPa) | Breaking position |
|---|---|---|---|---|---|---|---|---|
| 55 | CuBe11 |  |  |  |  | Remains | 730 | Bonding part |
| 56 | CuBe11 | — | — | — | — | — | — | — |
| 57 | CuBe11 | — | — | — | — | — | — | — |

Bonded body (Examples 47 to 54) subjected to solution annealing
(930° C. × 5 min → cooling with water) and aging treatment (500° C. × 2 h → cooling in furnace) after homogenization annealing (temperature below × 8 h → cooling in furnace),
or bonded body (Examples 55 to 57) subjected to solution annealing
(930° C. × 5 min → cooling with water) and aging treatment (450° C. × 3 h → cooling in furnace) after homogenization annealing (temperature below × 8 h → cooling in furnace)

| | 960° C. | | | 980° C. | | | |
|---|---|---|---|---|---|---|---|
| Ex. | Bonding interface remains or not | Bonding strength (MPa) | Breaking position | Bonding interface remains or not | Bonding strength (MPa) | Breaking position | Electrical conductivity (IACS %) |
| 47 | Remains | 646 | Base material | — | — | — | — |
| 48 | Remains | 622 | Base material | — | — | — | — |
| 49 | — | — | — | — | — | — | — |
| 50 | — | — | — | — | — | — | — |
| 51 | — | — | — | — | — | — | — |
| 52 | — | — | — | — | — | — | — |
| 53 | Remains | 878 | Bonding part | — | — | — | — |
| 54 | — | — | — | — | — | — | — |
| 55 | Not | 765 | Base material | Not | 752 | Base material | 55.8 |
| 56 | Remains | 715 | Bonding part | — | — | — | — |
| 57 | Not | 725 | Bonding part | Not | 732 | Base material | 56.3 |

<Evaluation of Hydrogen-Embrittlement-Resistant Property by Slow Strain Rate Tensile Test (SSRT)>

Figure 9A:
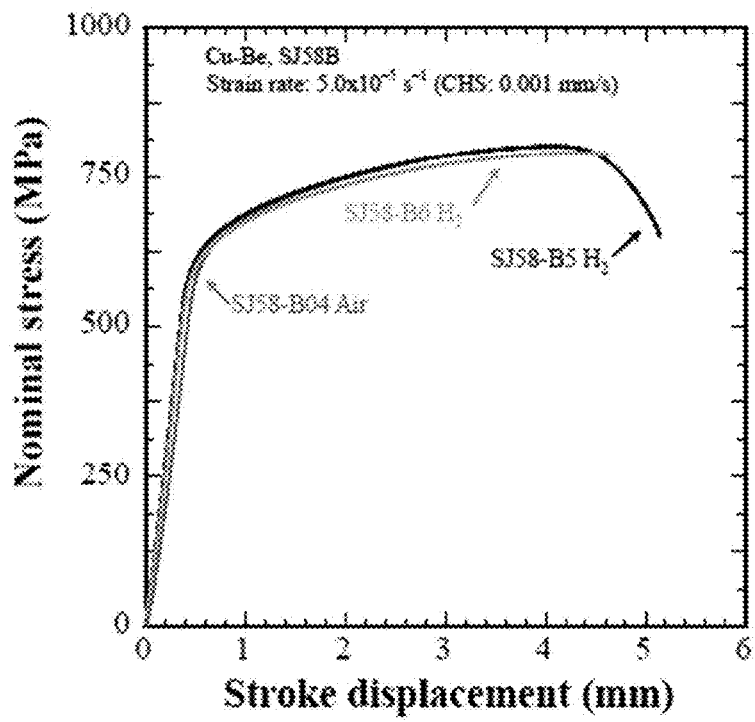
FIG. 9A is a stress-stroke diagram in a slow strain rate tensile test (SSRT) performed in air or a hydrogen gas on a copper alloy bonded body (CuBe11) of Example 2 prepared through solution annealing and an aging treatment.
Figure 9B:
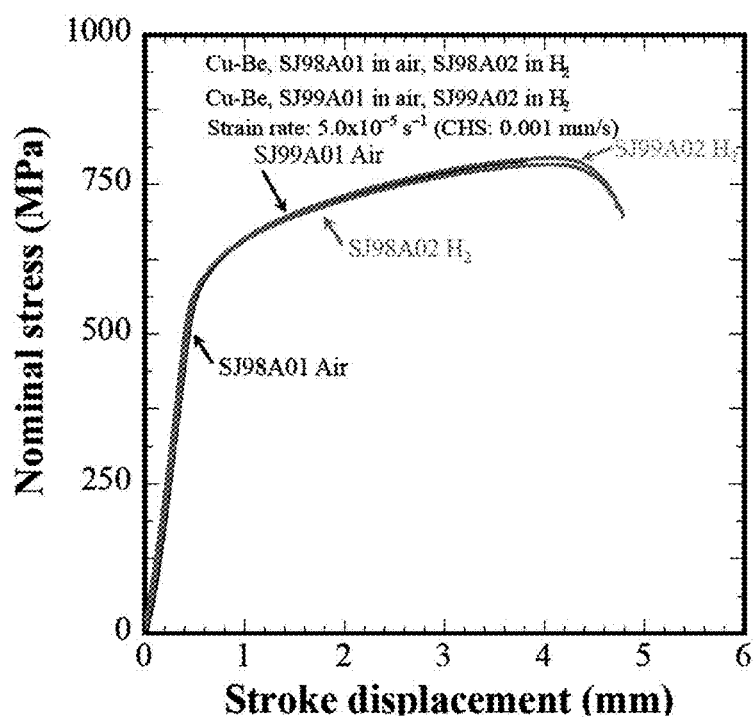
FIG. 9B is a stress-stroke diagram in a slow strain rate tensile test (SSRT) performed in air or a hydrogen gas on copper alloy bonded bodies (CuBe11) of Examples 17 and 18 prepared through solution annealing and an aging treatment.
Figure 10A:
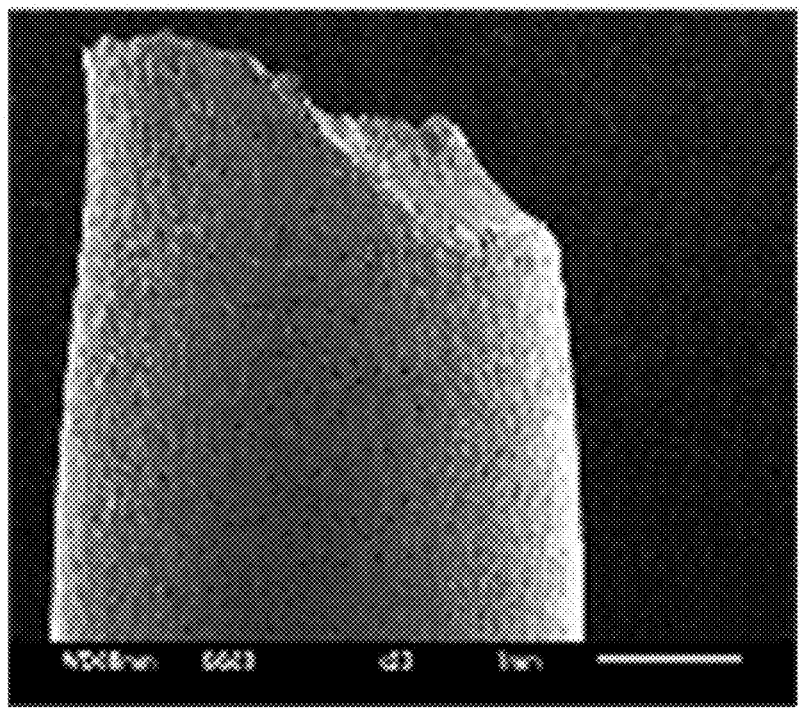
FIG. 10A is a SEM image obtained by observing a broken surface after a slow strain rate tensile test (SSRT) in air for a copper alloy bonded body (CuBe11) of Example 17 prepared through solution annealing and an aging treatment.
Figure 10B:
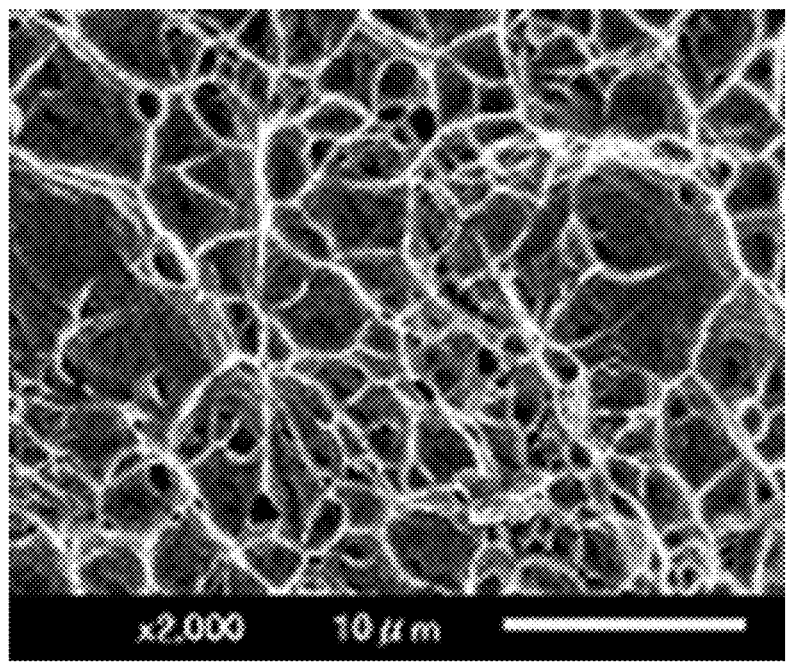
FIG. 10B is an enlarged SEM image obtained by observing a particular position of the broken surface shown in FIG. 10A.

Each of the copper alloy bonded bodies (CuBe11) prepared through the bonding and the solution aging in Examples 2, 17, and 18 was cut out to prepare a specimen in accordance with ASTM E8M Specimen 4 in such a way that the bonding part was at the central position of the specimen. Note that the homogenization treatment was not performed on those specimens. The slow strain rate tensile test was performed in accordance with ASTM-G-142 at a displacement rate of 0.001 mm/sec (a strain rate of 0.00005/sec) in the air or in 95 MPa hydrogen for smooth specimens. Note that in the slow strain rate tensile test for smooth specimens, the hydrogen-embrittlement-resistant property was evaluated by RRA (relative reduction of area). Table 6A shows the test results, FIGS. 9A and 9B show stress-stroke diagrams, and FIGS. 10A and 10B show SEM images obtained by observing a breaking surface of the specimen of Example 17. There was no change in tensile strength and reduction of area for each specimen under the air or under hydrogen and hydrogen embrittlement was not recognized. Fracture shown in FIGS. 10A and 10B occurred in the base material part, the fracture form is cup-and-corn fracture, and the breaking surface had a dimple shape characteristic of ductile fracture. These show that the bonded materials of the present invention exhibit favorable properties in that the bonded materials of the present invention have a high tensile strength and are superior in the hydrogen-embrittlement-resistant property.

Figure 9C:
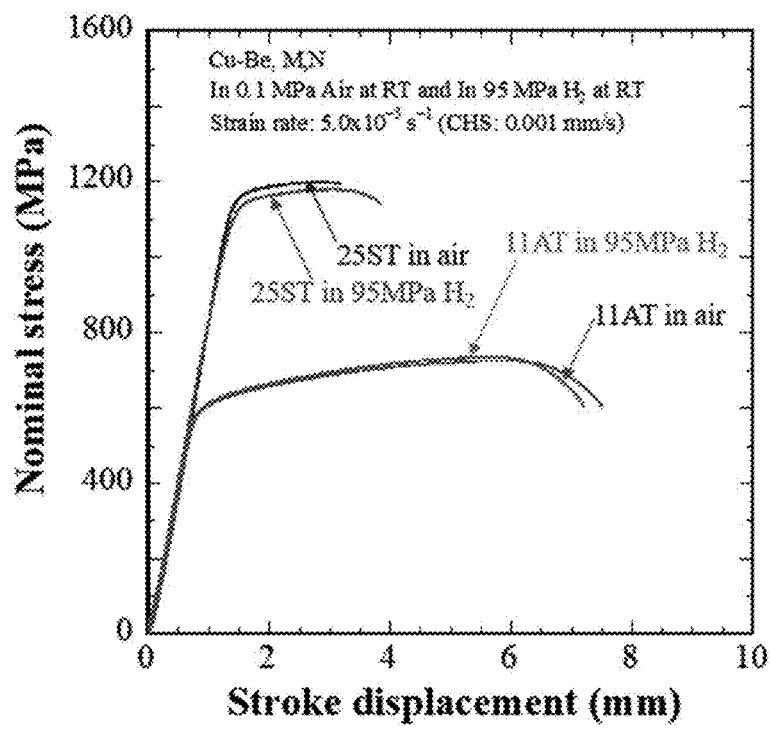
FIG. 9C is a stress-stroke diagram in a slow strain rate tensile test (SSRT) performed in air or a hydrogen gas on a solution-annealed and aging-treated beryllium copper alloy 11 or beryllium copper alloy 25 used as a bonding material.
Figure 9D:
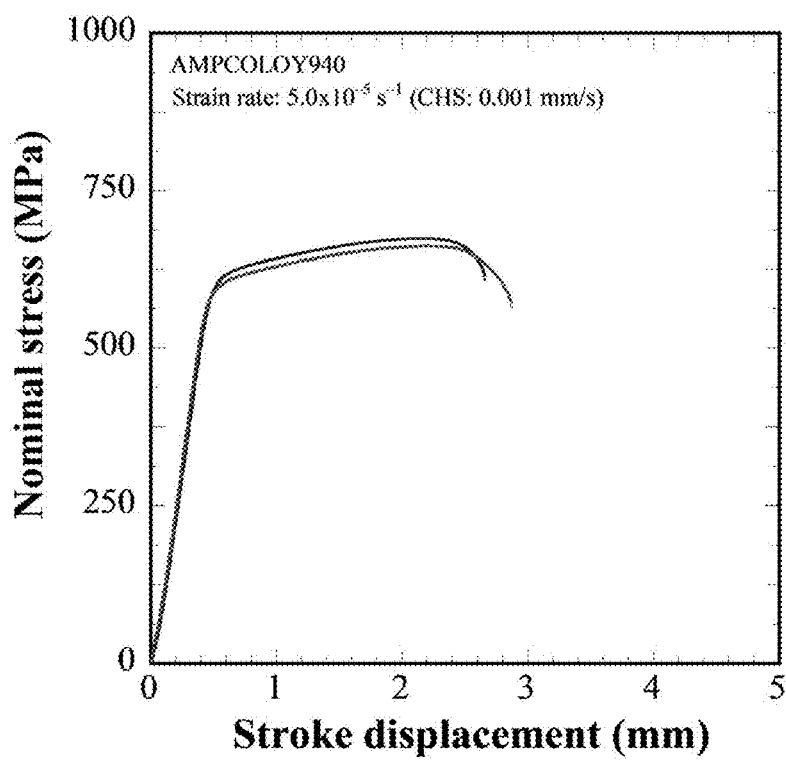
FIG. 9D is a stress-stroke diagram in a slow strain rate tensile test (SSRT) performed in air or a hydrogen gas on solution-annealed and aging-treated Corson copper AMPCO940 used as a bonding material.
Figure 9E:
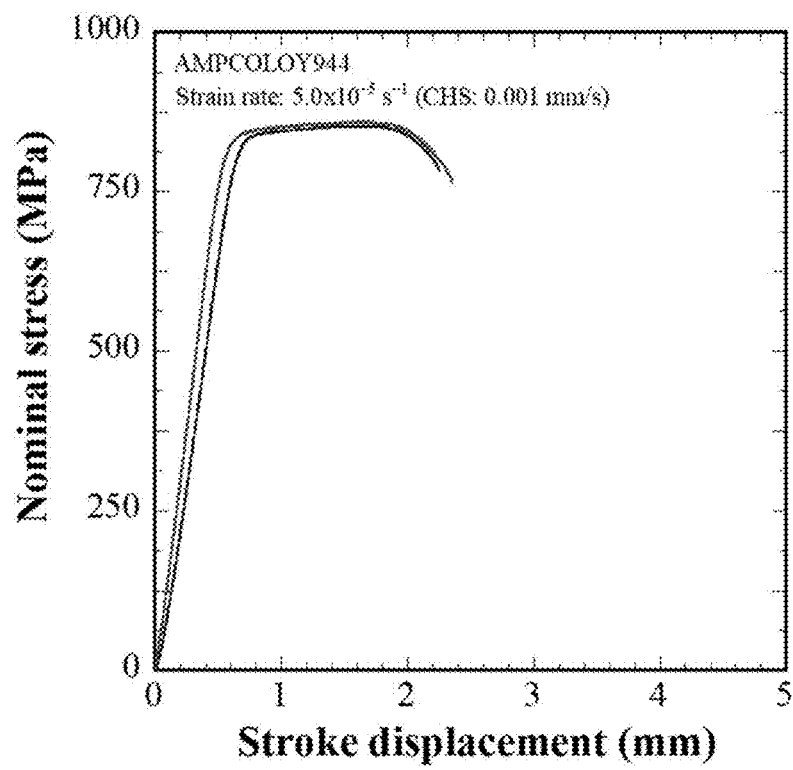
FIG. 9E is a stress-stroke diagram in a slow strain rate tensile test (SSRT) performed in air or a hydrogen gas on solution-annealed and aging-treated Corson copper AMPCO944 used as a bonding material.

In addition, the hydrogen-embrittlement-resistant property of each of the copper alloy materials themselves to be used for preparing the copper alloy bonded bodies was also evaluated instead of the copper alloy bonded bodies. Specifically, each solution-annealed and aging-treated material of CuBe alloy 25 (material 1), CuBe alloy 11 (material 2), Corson copper AMPCO940 (material 3), and Corson copper AMPCO944 (material 4) was cut out to prepare a specimen in accordance with ASTM E8M Specimen 4. The slow strain rate tensile test was performed in accordance with ASTM-G-142 at a displacement rate of 0.001 mm/sec (a strain rate of 0.00005/sec) in the air or in 95 MPa hydrogen for smooth specimens. Note that in the slow strain rate tensile test for smooth specimens, the hydrogen-embrittlement-resistant property was evaluated by RRA (relative reduction of area). Table 6B shows the test results, and FIGS. 9C to 9E show stress-stroke diagrams. There was no change in tensile strength and reduction of area for each specimen under the air or under hydrogen and hydrogen embrittlement was not recognized. The fracture form is cup-and-corn fracture, and the breaking surface had a dimple shape characteristic of ductile fracture. These results show that these materials exhibit favorable properties as copper alloy materials to be used for preparing the copper alloy bonded materials of the present invention in that these materials have a high tensile strength after bonding and are superior in the hydrogen-embrittlement-resistant property.

TABLE 6A

| Specimen number | Alloy type | Strain rate (s$^{-1}$) | Atmosphere | $\sigma_B$ (MPa) | Relative tensile strength RTS |
|---|---|---|---|---|---|
| Ex. 2 SJ58-B4 | CuBe11 | 5.0 × 10$^{-5}$ | Room temp., air | 772 | — |
| SJ58-B5 | CuBe11 | 5.0 × 10$^{-5}$ | Room temp., 95 MPa H$_2$ | 798 | 1.03 |
| SJ58-B6 | CuBe11 | 5.0 × 10$^{-5}$ | Room temp., 95 MPa H$_2$ | 784 | 1.02 |
| Ex. 17 SJ98-A01 | CuBe11 | 5.0 × 10$^{-5}$ | Room temp., air | 761 | — |
| SJ98-A02 | CuBe11 | 5.0 × 10$^{-5}$ | Room temp., 95 MPa H$_2$ | 790 | — |
| Ex. 18 SJ99-A01 | CuBe11 | 5.0 × 10$^{-5}$ | Room temp., air | 779 | 1.02 |
| SJ99-A02 | CuBe11 | 5.0 × 10$^{-5}$ | Room temp., 95 MPa H$_2$ | 789 | 1.00 |

|  | δ (%) | Relative elongation REL | φ (%) | Relative reduction of area RRA | Breaking position |
|---|---|---|---|---|---|
| Ex. 2 | 12 | — | 21 | — | Bonding part |
|  | 26 | 2.19 | 42 | 2.00 | Base material |
|  | 23 | 1.93 | 25 | 1.19 | Bonding part |
| Ex. 17 | 18 | — | 25 | — | Bonding part |
|  | 22 | — | 20 | — | Base material |
| Ex. 18 | 24 | 1.37 | 38 | 1.52 | Base material |
|  | 23 | 1.88 | 35 | 1.75 | Base material |

TABLE 6B

| Specimen number | Alloy type | Strain rate (s$^{-1}$) | Atmosphere | $\sigma_B$ (MPa) |
|---|---|---|---|---|
| Material 1 A1801-1 | CuBe25ST | 5.0 × 10$^{-5}$ | Room temp., air | 1182 |
| A1801-2 | CuBe25ST | 5.0 × 10$^{-5}$ | Room temp., 95 MPa H$_2$ | 1178 |
| Material 2 C64207-1 | CuBe11AT | 5.0 × 10$^{-5}$ | Room temp., air | 724 |
| C64207-2 | CuBe11AT | 5.0 × 10$^{-5}$ | Room temp., 95 MPa H$_2$ | 734 |
| Material 3 CNEA01 | AMPCO940 (Corson copper) | 5.0 × 10$^{-5}$ | Room temp., air | 676 |
| CNEA02 | AMPCO940 (Corson copper) | 5.0 × 10$^{-5}$ | Room temp., 95 MPa H$_2$ | 663 |
| Material 4 CNFA01 | AMPCO944 (Corson copper) | 5.0 × 10$^{-5}$ | Room temp, air | 854 |
| CNFA03 | AMPCO944 (Corson copper) | 5.0 × 10$^{-5}$ | Room temp., 95 MPa H$_2$ | 860 |

|  | Relative tensile strength RTS | δ (%) | Relative elongation REL | φ (%) | Relative reduction of area RRA |
|---|---|---|---|---|---|
| Material 1 | — | 8 | — | 13 | — |
|  | 1.00 | 9 | 1.18 | 20 | 1.54 |
| Material 2 | — | 26 | — | 47 | — |
|  | 1.01 | 25 | 0.95 | 47 | 1.00 |
| Material 3 | — | 14 | — | 23 | — |
|  | 0.98 | 16 | 1.12 | 29 | 1.26 |
| Material 4 | — | 10 | — | 23 | — |
|  | 1.01 | 12 | 1.17 | 26 | 1.13 |

Examples 58 to 67

Bonded body samples including a flow passage space inside were prepared under various conditions and evaluated.

<Studies on Bonding Conditions for Alleviating Crush of Flow Passage>

A plurality of copper alloy plates (cast products) of alloy types and compositions shown in Table 7 and of a thickness of 1.6 mm and a size of 50 mm×50 mm was provided. A groove having an arch-shaped section of a size of 2.4 mm in width×1.2 mm in depth for forming a flow passage space was formed by etching on the surfaces of half of the copper alloy plates. An oxide film on each bonding surface was removed with 30% nitric acid, and then the copper alloy plate with a groove and the copper alloy plate without a groove were alternately stacked or the alloy boards including a groove on each surface were alternately stacked, and then diffusion-bonded by hot-pressing under bonding conditions and amount of deformation during bonding shown in Table 7. Thus, intermediate bonded bodies having a flow passage space were obtained. The degree of crush of each flow passage and the bonding state were evaluated by observation with a microscope for the obtained intermediate bonded bodies. Diffusion bonding is more favorably performed as the temperature is higher, but as can be seen from the results shown in Table 7, with respect to the hollow bodies of the present examples, in which a flow passage was formed, there is a tendency that the crush is remarkable and the flow passage is narrow and even blocked at high temperatures and high pressures. To alleviate such crush, bonding conditions of a temperature of 840° C. or lower and a pressure of 5 MPa or higher are considered to be preferable for the hollow bodies. In addition, when the bonding state was observed with a microscope for the intermediate bonded bodies, disappearance of the bonding surface was confirmed under bonding conditions of a high temperature and a high pressure, but the bonding surface was confirmed to remain irrespective of bonding pressure as the temperature was decreased. However, as demonstrated by the above-described Examples, the homogenization treatment at a high temperature enables disappearance of the bonding surface. Accordingly, in the production of a bonded body including a flow passage space, it can be said to be advantageous to perform a high-temperature homogenization treatment after performing bonding at a high load and at a somewhat lower temperature to such an extent that the crush of a flow passage is suppressed.

Table 7

TABLE 7

| Ex. | Copper alloy | | Bonding conditions | | Amount of deformation during bonding (%) | Degree of crush of flow passage |
|---|---|---|---|---|---|---|
| | Alloy type | Alloy composition (% by weight) | Temp. × time | Pressure (MPa) | | |
| 58 | CuBe11 | Cu-1.89Ni-0.43Be | 900° C. × 1 h | 12 | 19.4 | Large (crushed) |
| 59 | | | 900° C. × 1 h | 6 | 10.7 | Large |
| 60 | | | 900° C. × 1 h | 3 | 7.8 | Moderate |
| 61 | | | 840° C. × 1 h | 6 | 11.0 | Moderate |
| 62 | | | 840° C. × 1 h | 3 | 5.7 | Small |
| 63 | | | 810° C. × 1 h | 3 | 5.9 | Small |
| 64 | | | 760° C. × 1 h | 24 | 13.5 | Large |
| 65 | | | 700° C. × 1 h | 8 | 3.5 | Minimum |
| 66 | | | 700° C. × 1 h | 24 | 8.4 | Small |
| 67 | | | 640° C. × 1 h | 24 | 1.7 | Minimum |

Figure 11:
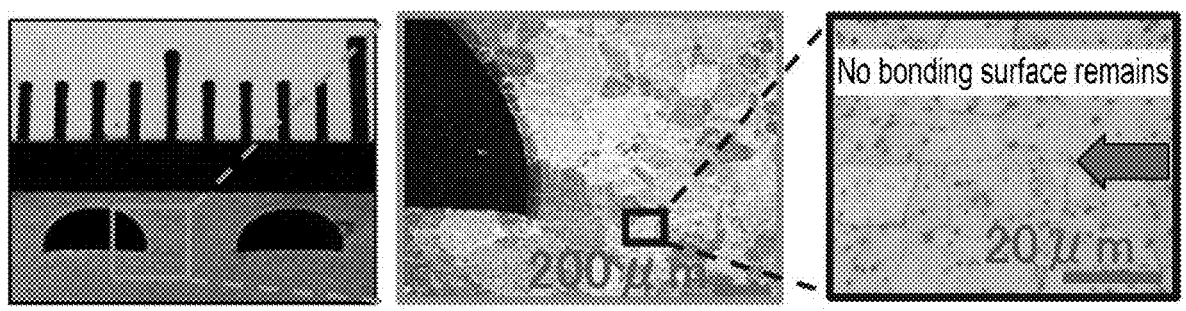
FIG. 11 shows optical microscope images obtained by observing a section including a bonding part of a bonded body sample of Example 62 including flow passage spaces, the sample prepared through a homogenization treatment at 980° C.

To support this, the following experiment including performing a high-temperature homogenization treatment on the intermediate bonded body of Example 62 was conducted. First of all, a homogenization treatment (high-temperature soaking) was performed at 980° C. for 8 hours on the intermediate bonded body which was prepared in Example 62 (840° C., 3 Pa) and includes a flow passage space. This intermediate bonded body was held at 930° C. for 5 minutes and cooled with water (solution annealing). The resultant bonded body was held at 450° C. for 3 hours and then cooled in a furnace (aging treatment). Thus, a copper alloy bonded body (including a flow passage) on which the homogenization treatment and the solution aging had been performed was obtained. FIG. 11 shows optical microscope images obtained by observing a section including the bonding part near a flow passage of the prepared copper alloy bonded body of Example 62. As shown in FIG. 11, disappearance of the bonding interface was confirmed in the bonded body on which the homogenization treatment had been performed. As described above, when the homogenization treatment is performed after diffusion bonding, the bonding interface disappears and becomes indistinguishable from the base material, resulting in complete homogenization (in other words, crystal grains of the age-hardenable copper alloy grown beyond the former bonding interface are present at the bonding part.). Therefore, when a tensile test is performed, fracture of the base material, not at the bonding surface, occurs (however, even when the homogenization treatment is not performed, fracture of the base material occurs in some bonded bodies, and therefore the homogenization treatment is not essential for crystal grain growth beyond the former bonding interface.). Accordingly, as described above, when bonding at a low temperature and at a high load, which hardly causes crush of a flow passage, is performed, the bonding surface is confirmed to remain, but performing a high-temperature homogenization treatment enables disappearance of the bonding surface.

What is claimed is:

1. A copper alloy bonded body composed of a plurality of members made of an age-hardenable copper alloy, the members diffusion-bonded to one another, wherein the copper alloy bonded body has undergone solution annealing including heating at a temperature of 700 to 1100° C. for 1 to 180 minutes and an aging treatment at 350 to 550° C. for 30 to 480 minutes,
   wherein a content of beryllium in the age-hardenable copper alloy is 0.7% by weight or less, and wherein:
   (i) a bonding interface between the members has disappeared and/or
   (ii) a bonding interface between the members remains, and an oxide film at the bonding interface has a thickness of 0 nm or more and 5.0 nm or less.

2. The copper alloy bonded body according to claim 1, comprising crystal grains of the age-hardenable copper alloy grown beyond the bonding interface or a position where the bonding interface was present.

3. The copper alloy bonded body according to claim 1, wherein the oxide film has a thickness of 0 nm or more and 1.0 nm or less.

4. The copper alloy bonded body according to claim 1, wherein a residual component derived from a material other than the age-hardenable copper alloy is absent at the bonding interface or a position where the bonding interface was present.

5. The copper alloy bonded body according to claim 1, wherein a base material and a bonding part of the copper alloy bonded body have a strength of 520 MPa or higher.

6. The copper alloy bonded body according to claim 5, wherein the base material and the bonding part of the copper alloy bonded body have a strength of 690 MPa or higher.

7. The copper alloy bonded body according to claim 1, wherein a base material including a bonding part of the copper alloy bonded body has a thermal conductivity of 209 W/mK or more.

8. The copper alloy bonded body according to claim 1, wherein a base material including a bonding part of the copper alloy bonded body has an electrical conductivity of 50 IACS % or more.

9. The copper alloy bonded body according to claim 1, wherein the age-hardenable copper alloy is at least one selected from the group consisting of beryllium copper alloy 11 (JIS alloy number C1751, EN material number CW110C, and UNS alloy number C17510), beryllium copper alloy 10 (EN material number CW104C and UNS alloy number C17500), beryllium copper CuCo1Ni1Be (EN material number CW103C), beryllium copper alloy 14Z (composed of Be: 0.2 to 0.6% by weight, Ni: 1.4 to 2.4% by weight, Zr: 0 to 0.5% by weight, and the balance being Cu and inevitable impurities), beryllium copper alloy 50 (composed of Be: 0.2 to 0.6% by weight, Ni: 1.4 to 2.1% by weight, Ag: 0.1 to 0.3% by weight, Zr: 0 to 0.5% by weight, and the balance being Cu and inevitable impurities), beryllium copper alloy 10Zr (composed of Be: 0.4 to 0.7% by weight, Co: 2.0 to 2.8% by weight, Zr: 0 to 0.3% by weight, and the balance being Cu and inevitable impurities), chromium copper (UNS alloy number C18200), chromium zirconium copper (UNS alloy number C18510 and EN material number CW106C), zirconium copper (UNS alloy number C15000, EN material number CW120C), and Corson copper (EN material number CW109C, CW111C, UNS alloy number C19010, C70250, AMPCO944 (composed of Ni: 6.5 to 7.5% by weight, Si: 1.5 to 2.5% by weight, Cr: 0.5 to 1.5% by weight, and the balance being Cu and inevitable impurities), and AMPCO940 (composed of Ni: 1.5 to 3.0% by weight, Si: 0.5 to 1.5% by weight, Cr: 0.3 to 1.5% by weight, and the balance being Cu and inevitable impurities)).

10. The copper alloy bonded body according to claim 9, wherein the age-hardenable alloy is at least one selected from the group consisting of beryllium copper alloy 11 (JIS alloy number C1751, EN material number CW110C, and UNS alloy number C17510), beryllium copper alloy 10 (EN material number CW104C and UNS alloy number C17500), beryllium copper CuCo1Ni1Be (EN material number CW103C), beryllium copper alloy 14Z (composed of Be: 0.2 to 0.6% by weight, Ni: 1.4 to 2.4% by weight, Zr: 0 to 0.5% by weight, and the balance being Cu and inevitable impurities), beryllium copper alloy 50 (composed of Be: 0.2 to 0.6% by weight, Ni: 1.4 to 2.1% by weight, Ag: 0.1 to 0.3% by weight, Zr: 0 to 0.5% by weight, and the balance being Cu and inevitable impurities), and beryllium copper alloy 10Zr (composed of Be: 0.4 to 0.7% by weight, Co: 2.0 to 2.8% by weight, Zr: 0 to 0.3% by weight, and the balance being Cu and inevitable impurities).

11. The copper alloy bonded body according to claim 1, prepared using a copper alloy member having an RRA (Relative Reduction of Area) of 0.8 or more in a hydrogen gas, measured in a slow strain rate tensile test performed at a strain rate of $5 \times 10^{-5}$ s$^{-1}$ or less.

12. The copper alloy bonded body according to claim 1, wherein the copper alloy bonded body including a bonding part has a tensile strength of 520 MPa or higher in a hydrogen gas, measured in a slow strain rate tensile test performed at a strain rate of $5 \times 10^{-5}$ s$^{-1}$ or less.

13. The copper alloy bonded body according to claim 12, wherein the copper alloy bonded body including a bonding part has a tensile strength of 690 MPa or higher in a hydrogen gas, measured in a slow strain rate tensile test performed at a strain rate of $5 \times 10^{-5}$ s$^{-1}$ or less.

14. The copper alloy bonded body according to claim 1, wherein the copper alloy bonded body comprises a flow passage space inside.

15. A method for producing the copper alloy bonded body according to claim 1, comprising:
providing a plurality of members made of an age-hardenable copper alloy, wherein each surface to be bonded is a flat surface having a flatness of 0.1 mm or less and a ten-point average roughness Rzjis of 6.3 μm or less, and wherein the content of beryllium is 0.7% by weight or less;
removing an oxide film present at each surface to be bonded of a plurality of the members;
subjecting a plurality of the members to diffusion bonding by hot pressing to provide an intermediate bonded body;
subjecting the intermediate bonded body to solution annealing including heating at a temperature of 700 to 1100° C. for 1 to 180 minutes and subsequent water cooling; and
subjecting the solution-annealed intermediate bonded body to an aging treatment at 350 to 550° C. for 30 to 480 minutes.

16. The method according to claim 15, wherein removing the oxide film is performed by washing each surface to be bonded of a plurality of the members with an inorganic acid solution.

17. The method according to claim 15, wherein the hot pressing is performed by applying a pressure of 1.0 MPa or higher at a temperature of 500 to 1050° C. for 30 to 480 minutes in a furnace wherein a degree of vacuum is higher than $1.0 \times 10^{-2}$ Torr (that is, pressure is lower than $1.0 \times 10^{-2}$ Torr).

18. The method according to claim 15, wherein when the age-hardenable copper alloy is free of Be, the hot pressing is performed by applying a pressure of 1.0 MPa or higher at a temperature of 500 to 1050° C. for 30 to 480 minutes in a furnace wherein a degree of vacuum is higher than $1.0 \times 10^{-1}$ Torr (that is, pressure is lower than $1.0 \times 10^{-1}$ Torr).

19. The method according to claim 15, wherein the method further comprises, prior to the solution annealing, subjecting the intermediate bonded body to a homogenization treatment at a temperature of 900 to 1050° C. for 60 to 480 minutes in a furnace wherein a degree of vacuum is higher than $1.0 \times 10^{-1}$ Torr (that is, pressure is lower than $1.0 \times 10^{-1}$ Torr) or in a furnace under an atmosphere of nitrogen or another non-oxidizing gas.

20. The method according to claim 19, wherein the hot pressing and the homogenization treatment are continuously performed by releasing a pressing load without decreasing the temperature in the furnace; and increasing the temperature.

21. The method according to claim 15, wherein the method further comprises, prior to removing the oxide film, forming a groove that provides a flow passage space after bonding to each surface to be bonded of a plurality of the members.

22. The method according to claim 21, wherein the hot pressing is performed in a furnace wherein a degree of vacuum is higher than $1.0 \times 10^{-2}$ Torr (that is, pressure is lower than $1.0 \times 10^{-2}$ Torr) by:

(i) applying a pressure of 1 MPa or higher and 4 MPa or lower at a temperature of higher than 840° C. and 930° C. or lower for 30 to 480 minutes,
(ii) applying a pressure of 2 MPa or higher and 8 MPa or lower at a temperature of higher than 720° C. and 840° C. or lower for 30 to 480 minutes, or
(iii) applying a pressure of 4 MPa or higher and 30 MPa or lower at a temperature of 600° C. or higher and 720° C. or lower for 30 to 480 minutes, and
wherein the method further comprises, prior to the solution annealing, subjecting the intermediate bonded body to a homogenization treatment at a temperature of 900 to 1050° C. for 60 to 480 minutes in a furnace wherein a degree of vacuum is higher than $1.0 \times 10^{-1}$ Torr (that is, pressure is lower than $1.0 \times 10^{-1}$ Torr) or in a furnace under an atmosphere of nitrogen or another non-oxidizing gas.

23. The method according to claim 22, wherein the hot pressing and the homogenization treatment are continuously performed by releasing a pressing load without decreasing the temperature in the furnace; and increasing the temperature.

\* \* \* \* \*